(12) United States Patent
Raith et al.

(10) Patent No.: US 11,939,200 B2
(45) Date of Patent: Mar. 26, 2024

(54) APPARATUS AND METHOD FOR TREATING CONTAINERS

(71) Applicant: KRONES AG, Neutraubling (DE)

(72) Inventors: Tobias Raith, Barbing (DE); Martin Kammerl, Hemau (DE); Klaus Voth, Obertraubling (DE); Eduard Handschuh, Donaustauf (DE); Robert Aumer, Woerth a.d. Donau (DE); Jochen Krueger, Hagelstadt (DE); Michael Neubauer, Grassau (DE)

(73) Assignee: KRONES AG (DE)

( * ) Notice: Subject to any disclaimer, the term of this patent is extended or adjusted under 35 U.S.C. 154(b) by 342 days.

(21) Appl. No.: 17/253,015

(22) PCT Filed: Sep. 30, 2019

(86) PCT No.: PCT/EP2019/076423
§ 371 (c)(1),
(2) Date: Mar. 18, 2022

(87) PCT Pub. No.: WO2020/126139
PCT Pub. Date: Jun. 25, 2020

(65) Prior Publication Data
US 2022/0234876 A1 Jul. 28, 2022

(30) Foreign Application Priority Data

Dec. 18, 2018 (DE) .................... 10 2018 132 608.4

(51) Int. Cl.
*B67C 7/00* (2006.01)
*B65G 29/00* (2006.01)
(Continued)

(52) U.S. Cl.
CPC .......... *B67C 7/0013* (2013.01); *B65G 47/841* (2013.01); *B65G 47/846* (2013.01); *B65G 47/847* (2013.01); *B65G 29/00* (2013.01)

(58) Field of Classification Search
CPC .. B67C 7/0013; B65G 47/841; B65G 47/846; B65G 47/847; B65G 47/848; B65G 29/00
(Continued)

(56) References Cited

U.S. PATENT DOCUMENTS 3,883,016 A * 5/1975 Simpatico .............. B65G 29/00
414/811
4,164,997 A * 8/1979 Mueller ................. B65G 47/71
198/441
(Continued)

FOREIGN PATENT DOCUMENTS

CN 103569433 2/2014 ............. B65B 61/26
CN 106794113 5/2017 ................ A61J 1/14
(Continued)

OTHER PUBLICATIONS

Notice of Reasons for Refusal issued in Japanese Patent Appln. Serial No. 2020-570098, dated Mar. 30, 2023, with machine English translation, 23 pages.
(Continued)

*Primary Examiner* — James R Bidwell
(74) *Attorney, Agent, or Firm* — HAYES SOLOWAY P.C.

(57) ABSTRACT

Apparatus for treating containers includes a handling device for the containers wherein the handling devices has a movable carrier with which the containers can be moved on a transport path, and wherein the handling devices is assigned at least one handling station, wherein the transport speed of the handling device can be controlled in such a way that the transport speed of the handling device can be synchronised with the transport speed of the transport device
(Continued)

and/or a further transport device during transfer and/or discharge of the containers and the transport speed of the handling device can be reduced after the transfer of the containers.

21 Claims, 24 Drawing Sheets

(51) Int. Cl.
*B65G 47/84* (2006.01)
*B65G 47/86* (2006.01)

(58) Field of Classification Search
USPC .................................................. 198/478.1
See application file for complete search history.

(56) References Cited

U.S. PATENT DOCUMENTS

| | | | | |
|---|---|---|---|---|
| 4,178,659 | A * | 12/1979 | Simonds | A22C 21/0053 198/486.1 |
| 4,554,774 | A | 11/1985 | Miyashita et al. | 53/52 |
| 6,112,880 | A | 9/2000 | Flix | B65G 47/26 |
| 6,820,671 | B2 * | 11/2004 | Calvert | A61F 13/15772 198/478.1 |
| 10,376,654 | B2 | 8/2019 | Sanders et al. | A61M 5/34 |
| 10,787,324 | B2 * | 9/2020 | Neubauer | B65G 54/02 |
| 2012/0285800 | A1 * | 11/2012 | Kraus | B65G 47/847 198/478.1 |
| 2016/0214799 | A1 | 7/2016 | Walter et al. | B65G 37/02 |
| 2018/0208404 | A1 | 7/2018 | Kumagai et al. | B65G 43/10 |
| 2018/0292618 | A1 | 10/2018 | Chang et al. | G02B 6/3898 |

FOREIGN PATENT DOCUMENTS

| | | | | |
|---|---|---|---|---|
| DE | 2 244 858 | | 3/1974 | ............ B67C 7/00 |
| DE | 3529716 | A1 * | 3/1987 | ............ B65G 47/84 |
| DE | 41 14 889 | | 11/1992 | ............ B67C 7/00 |
| DE | 10 2013 218 403 | | 3/2015 | ............ B65G 47/52 |
| EP | 0 860 385 | | 8/1998 | ............ B65G 47/08 |
| EP | 2412651 | * | 2/2010 | ............ B65G 47/84 |
| EP | 2 689 933 | | 7/2013 | ............ B41J 3/407 |
| FR | 3 064 614 | | 10/2018 | ............ B65G 47/52 |
| JP | S59-209595 | | 11/1984 | ............ B67C 7/00 |
| JP | S60-34391 | | 2/1985 | ............ B67C 7/00 |
| JP | H5-294392 | | 11/1993 | ............ B67C 3/02 |
| JP | 11-49278 | | 2/1999 | ............ B65D 88/12 |
| JP | 2007-83176 | | 4/2007 | ............ B07C 5/34 |
| JP | 2018135179 | | 8/2018 | ............ B65G 43/00 |
| WO | WO 02/34666 | | 5/2002 | ............ B67C 7/00 |
| WO | WO 2018/185015 | | 10/2018 | ............ B67C 7/00 |

OTHER PUBLICATIONS

First Office Action issued in Chinese Patent Appln. Serial No. 201980040065, dated Jan. 5, 2022, with English translation, 11 pages.
German Search Report issued in German Patent Appln. No. 10 2018 132 608.4, dated Nov. 20, 2019, with machine English translation, 15 pages.
International Search Report (w/ translation) and Written Opinion, issued in PCT/EP2019/076423, dated Dec. 17, 2019, 16 pages.
Notice of Reasons for Refusal issued in Japanese Patent Appln. Serial No. 2020-570098, dated Aug. 29, 2023, with machine English translation, 35 pages.

* cited by examiner

| | Phase: | Time: | Switching Station: |
|---|---|---|---|
| 1. Pass | 1 | 0 s | S1 |
| | 2 | 1.185 s | S6 |
| | 3 | 2.37 s | S2 |
| | 4 | 3.555 s | S7 |
| | 5 | 4.74 s | S3 |
| | 6 | 5.925 s | S8 |
| | 7 | 7.11 s | S4 |
| | 8 | 8.295 s | S9 |
| | 9 | 9.48 s | S5 |
| | 10 | 10.665 s | S10 |
| 2. Pass | 1 | 11.85 s | S1 |
| | 2 | 13.035 s | S6 |
| | 3 | 14.22 s | S2 |
| | 4 | 15.405 s | S7 |
| | 5 | 16.59 s | S3 |
| | 6 | 17.775 s | S8 |
| | 7 | 18.96 s | S4 |
| | 8 | 20.145 s | S9 |
| | 9 | 21.33 s | S5 |
| | 10 | 22.515 s | S10 |
| 3. Pass | 1 | 23.7 s | S1 |
| | 2 | 24.885 s | S6 |
| | 3 | 26.07 s | S2 |
| | 4 | 27.255 s | S7 |
| | 5 | 28.44 s | S3 |
| | 6 | 29.625 s | S8 |
| | 7 | 30.81 s | |
| | 8 | | |

Fig. 13b

| | Vacuum Supply 1 | | | Vacuum Supply 2 | | |
|---|---|---|---|---|---|---|
| | Phase: | Time: | Switching Station: | Phase: | Time: | Switching Station: |
| 1. Pass | 1 a | 0.000 s | S1 | 1 b | 0.600 s | S10 |
| | 2 a | 1.192 s | S2 | 2 b | 1.792 s | S11 |
| | 3 a | 2.383 s | S3 | 3 b | 2.983 s | S12 |
| | 4 a | 3.575 s | S4 | 4 b | 4.175 s | S13 |
| | 5 a | 4.767 s | S5 | 5 b | 5.367 s | S14 |
| | 6 a | 5.958 s | S6 | 6 b | 6.558 s | S15 |
| | 7 a | 7.150 s | S7 | 7 b | 7.750 s | S16 |
| | 8 a | 8.342 s | S8 | 8 b | 8.942 s | S17 |
| | 9 a | 9.533 s | S9 | 9 b | 10.133 s | S18 |
| 2. Pass | 1 a | 10.725 s | S1 | 1 b | 11.325 s | S10 |
| | 2 a | 11.917 s | S2 | 2 b | 12.517 s | S11 |
| | 3 a | 13.108 s | S3 | 3 b | 13.708 s | S12 |
| | 4 a | 14.300 s | S4 | 4 b | 14.900 s | S13 |
| | 5 a | 15.549 s | S5 | 5 b | 16.092 s | S14 |
| | 6 a | 16.683 s | S6 | 6 b | 17.283 s | S15 |
| | 7 a | 17.875 s | S7 | 7 b | 18.475 s | S16 |
| | 8 a | 19.067 s | S8 | 8 b | 19.667 s | S17 |
| | 9 a | 20.258 s | S9 | 9 b | 20.858 s | S18 |
| 3. Pass | 1 a | 21.450 s | S1 | 1 b | 22.050 s | S10 |
| | 2 a | 22.642 s | S2 | 2 b | 23.242 s | S11 |
| | 3 a | 23.833 s | S3 | 3 b | 24.433 | |
| | 4 a | 25.025 s | S4 | | | |
| | 5 a | 26.217 s | S5 | | | |
| | 6 a | 27.408 s | S6 | | | |
| | 7 a | 28.600 s | | | | |
| | 8 a | 29.792 s | | | | |

Fig. 14b

| | Phase: | Time: | Switching Station: |
|---|---|---|---|
| 1. Pass | 1 | 0 s | S1 |
| | 2 | 2.35 s | S4 |
| | 3 | 4.7 s | S2 |
| | 4 | 7.05 s | S5 |
| | 5 | 9.4 s | S3 |
| | 6 | 11.8 s | S6 |
| 2. Pass | 1 | 14.1 s | S1 |
| | 2 | 16.5 s | S4 |
| | 3 | 18.8 s | S2 |
| | 4 | 21.2 s | S5 |
| | 5 | 23.5 s | S3 |
| | 6 | 25.9 s | S6 |
| 3. Pass | 1 | 28.2 s | S1 |
| | 2 | 30.6 s | S4 |
| | 3 | 32.9 s | S2 |
| | 4 | 35.3 s | S5 |
| | 5 | 37.6 s | |

Fig. 15b

APPARATUS AND METHOD FOR TREATING CONTAINERS

The present invention concerns an apparatus and a method for treating containers. In the prior art, such treatment machines for containers are mainly constructed as rotary machines. This design has several advantages. For example, high machine outputs are possible with rotary machines.

However, rotary machines also have some disadvantages. On the one hand, they have large moving masses. Another disadvantage is that the treatment stations are located on the rotating part of the rotary machines. Both the treatment stations themselves and the process media (e.g. filling medium in filling machines, ink in printing machines, etc.) are therefore exposed to high centrifugal forces. In addition, a complex rotary transmission is required for the power and media supply. In addition, rotary machines are relatively inflexible. An extension of the system is only possible with difficulty. The entire system must also be shut down if only a single treatment station is to be maintained.

An object of the invention is therefore providing an apparatus and a method which does not have these disadvantages.

These objects are achieved, according to the invention, by the subject-matter of the independent claims. Advantageous embodiments and modifications are the subject matter of the subclaims.

An apparatus for handling containers according to the invention has at least one transport device for transporting the containers. The apparatus according to the invention has a handling device for transferring a predefined number of containers from the transport device in a transfer area and for discharging these containers to the transport device or a further transport device in a discharge area. The apparatus according to the invention also has at least one further handling device for transferring a predefined number of containers from the transport device in a further transfer area and for delivering these containers to the transport device or a further transport device in a further delivery area. The handling devices each have a movable carrier with which the removed containers can be moved along a transport path. At least one treatment station is assigned to each handling device.

According to the invention, the transport speed of the handling devices can be controlled in such a way that the transport speed of the handling devices during the transfer and/or discharge of the containers can be synchronised with the transport speed of the transport device and/or the further transport device. According to the invention, the transport speed of the handling device can be reduced after the transfer of the containers.

The term "transport speed" refers to the speed at which containers are moved along a transport path.

In an advantageous embodiment, the transport speed can be reduced to zero. Preferably, the speed of the containers can be reduced in the area of the treatment stations until the containers come to a standstill.

Advantageously, the movable carrier is a rotating carrier. However, it can also be a pivoting carrier, for example. Advantageously, all handling devices have the same direction of rotation. Preferably, a handling device has at least one handling unit for holding a container. A handling device particularly preferably has several handling units, each of which is suitable for holding a container. The handling units can preferably be holding devices or similar devices for holding the containers. The holding devices are preferably grippers, such as neck-handling clamps, which grip the containers.

However, other designs of the handling devices are also conceivable. For example, instead of the rotary (lifting) mechanism, the handling devices could also have a gantry system, a tripod robot or a robot arm to synchronise with the continuously running transport system for container pick-up and delivery and then take the containers to the treatment stations.

In an advantageous embodiment, the containers are transported by the transport device along an infeed section. The transfer areas to the handling devices are preferably located along this infeed section. It is advantageous that each handling device is assigned its own transfer area. Preferably, the number of transfer areas is identical with the number of handling devices. It is advantageous that the apparatus has a plurality of handling devices. Preferably, several transfer areas are located along the infeed section of the transport device.

In a preferred embodiment, one or several containers are thus transferred to a handling device, while the other containers are conveyed further by the transport device. It is advantageous to transfer the further transported containers to another handling device.

It is advantageous that the transfer area is an exactly defined spatial area. This means in particular that each container which is transferred to a certain handling device is transferred within this transfer area. It is advantageous that the transfer area is smaller than 10 cm, preferably smaller than 5 cm and especially preferably smaller than 1 cm.

In an advantageous embodiment, each handling device removes one or more containers from the infeed in its transfer area. The handling device preferably removes the containers with a rotational movement. If several containers are transferred to the handling device, these containers are preferably transferred one after the other in the transfer area, i.e. substantially at the same transfer point. Alternatively, the containers are removed from the infeed by a removal device, for example a robot, and transferred to the treatment stations. With this embodiment, the containers are not transferred at the same transfer point.

It is advantageous that the discharge area is an exactly defined spatial area. This means, in particular, that each container dispensed by a specific handling device is dispensed within this discharge area. It is advantageous that the discharge area is smaller than 10 cm, preferably smaller than 5 cm and especially preferably smaller than 1 cm.

In an advantageous embodiment, each handling device discharges in its discharge area one or more containers to the outlet. The handling device preferably discharges the containers with a rotational movement. If the handling device discharges several containers, these containers are preferably discharged one after the other in the discharge area, i.e. substantially at the same discharge point. Alternatively, the containers are removed from the treatment stations by a discharge device, for example a robot, and transferred to the outlet. With this design, the containers are not transferred at the same transfer point.

Preferably, several treatment stations are assigned to each handling device. It is advantageous that each handling device has at least the number of treatment stations corresponding to the predefined number of containers which are transferred to the handling device in one cycle at the transfer point. Preferably, the handling device has exactly this number of treatment stations. If, for example, four containers are transferred to the handling device in one cycle, this handling device preferably also has at least four treatment stations.

In a preferred embodiment, the treatment stations are arranged in a stationary manner.

One treatment station is advantageously suitable for treating at least one container. The treatment stations can be, for example, stations for a filling and/or closing process, a stretch blow moulding process, a decoration process, or a coating process. The advantage of a stationary arrangement of treatment stations for a stretch blow-moulding process is that the heavy blow-moulding station with its many media supplies no longer has to sit on a rotating blow wheel, but can simply be placed stationary in the machine. This brings a considerable cost advantage. Treatment stations for a decoration process can, for example, be stations for labelling and/or printing. A treatment station for a coating process can be stations for coating the inside and/or outside of the container. In particular, it can be stations for plasma coating. It is advantageous for each treatment station to have a vacuum chamber. Preferably, the device also has at least one vacuum pump.

In a preferred embodiment, the treatment station is located downstream of the transfer area and/or upstream of the discharge area in relation to the transport path of the containers. This arrangement is preferred for each of the treatment stations. This means that containers in a transfer area are first transferred to a handling device, fed to a downstream treatment station and, after treatment in a discharge area, discharged from the handling device.

In an advantageous embodiment, the transfer area and the discharge area of a handling device are spatially separated from each other. Preferably, the discharge area is arranged after a 180° rotation of the handling device starting from the transfer area.

For a clockwise direction of rotation, an example cycle of the handling device may look as follows: The handling device rotates at "12 o'clock" synchronously with the transport device and removes one or more containers. After leaving the collision area with the following containers, the handling device delays its rotation until it comes to a standstill at the "3 o'clock" position. Now the handling is carried out. Then the handling device accelerates to be synchronised with the discharge section of the conveyor in the "6 o'clock" position and to be able to discharge the container or the containers. The rotation of the handling device is now continued without containers up to the "12 o'clock" position. A new cycle can be started here.

In this embodiment, the handling devices can preferably be arranged along a transfer oval, i.e. on a transport device in which the containers are moved along an oval transport path. In this case, the handling devices can, for example, preferably be arranged inside the transfer oval, i.e. on the side of the conveyor facing the centre of curvature.

In this case, it is advantageous to transfer the containers to the handling devices in the first linear area of the transfer oval. The containers are then transported by the handling devices to the treatment stations located inside the transfer oval. After the treatment, the containers are transported further by the handling device and in the second linear area of the transfer oval opposite the first one, the containers are returned to the transport device. In this embodiment, only one single conveyor is required because the containers are transferred by the same transport device and returned to it after treatment.

Alternatively, two transport devices can be used. In this case, for example, the handling devices can be arranged between two linear areas of two different transfer ovals. In this case, the handling devices can take over containers from one transport device, transport the containers to treatment stations between the transport devices and, after treatment, transfer the containers to the second transport device. In such an embodiment, the linear sections of the two transport devices from which the containers are transferred or to which the containers are transferred are advantageously arranged parallel to each other.

In an alternative, preferred embodiment, the transfer area and the discharge area of a handling device are not spatially separated from each other, but the discharge area of a handling device is spatially identical to the transfer area of a handling device. The handling device is thus advantageous for picking up or discharging containers in the same area. The handling device is particularly preferably suitable for alternately picking up and discharging containers.

While the handling device has two contact points (transfer or discharge area) with the transport device in the embodiment described above, only one contact point is required in this embodiment. With the embodiment described first, more mechanical adjustment work is required, since adjusting one point leads to an adjustment of the other point. In the alternatively described embodiment there is only one contact point, which makes mounting and adjusting the machine much easier.

Instead of a separate infeed and discharge starwheel, this embodiment advantageously requires only one starwheel or another suitable transport device, such as for example a transfer chain, via which the containers can be fed to and discharged from the transport device.

In a preferred embodiment, the transport device is designed in such a way that it transports the plastic preforms in a predetermined and, in particular, uniform orientation in relation to their longitudinal axis. Advantageously the transport device has a plurality of transport units for transporting one container each. Advantageously the transport units are holding devices or similar, which hold the containers to be transported. Preferably, grippers, such as neck-handling clamps, are used to grip the containers.

In an advantageous embodiment, the transport device and/or a further transport device is a linear transport device. The term linear transport device means that the transport is linear at least in sections. It is not excluded that the transport also takes place in sections on a curved path. The transport device can, for example, be designed as transfer oval. A purely linear transfer is also conceivable. Alternatively, it would also be conceivable to design the transport device as a transport carousel. A transport device in the form of star columns is also conceivable.

For example, a linear transport device, in particular a conveyor belt, a transport chain or an individual transport by means of a linear motor can be used. The transport device can therefore be a chain or belt based system. Alternatively, the use of a long stator linear motor system would also be conceivable.

In a preferred embodiment, the handling devices are arranged on the side of the transport device. It is advantageous to position the handling devices in relation to the transport device in such a way that they can remove the objects to be treated from the transport device in a suitable manner or, after treatment, discharge the objects to the transport device.

In the case of a transport path which is curved at least in sections, the handling devices are preferably arranged on the side of the transport device that is turned away from the centre of curvature. In the case of a transport carousel, the handling devices are preferably arranged outside the transport carousel-like satellites. Also in the case of a transport oval, the handling devices are preferably arranged on the "outside" outside the area enclosed by the transport oval.

The treatment stations are also advantageously located on the side of the transport device facing away from the centre of curvature. In this way, it is advantageous to ensure better accessibility to the handling devices and the treatment stations, as these are not located inside the transport carousel/transport oval, but outside.

This arrangement of the handling devices is particularly preferred for the preferred embodiment, where the discharge area of the handling device is spatially identical to the transfer area of the handling device.

In an advantageous embodiment, the axes of rotation of the handling devices are arranged in such a way that the axis of rotation of one handling device is arranged in the swivel circle of the axis of rotation of another handling device.

It is advantageous that the handling devices are arranged substantially equidistant. The term "substantially" refers, on the one hand, to the fact that the distance between the individual handling devices does not differ by more than 30%, preferably by no more than 20% and particularly preferably by no more than 10%.

On the other hand, however, the term "substantially" also refers to the fact that it should not be excluded that the distance between individual handling devices may deviate significantly from this. Thus, for example, the term "substantially equidistant" should also include an arrangement with a transport oval, in which the distances between the handling devices in the area of one or the other linear section are the same, but there are other distances in the curved area of the transport device, or also that no handling device at all is arranged in this transport area. Accordingly, a design example is also to fall under the term "substantially equidistant", in which the handling devices a to e are arranged in a linear section of a transport oval, handling device e is followed by a curved transport section of the transport oval without handling devices and handling devices f to j are arranged in a further linear section.

In a further preferred embodiment, the apparatus has at least one additional handling device and/or treatment station that would not be necessary to achieve a desired machine output.

Advantageously, the apparatus has an additional handling device and/or treatment station which is not used in normal operation. I.e. in a possible embodiment, one or more spare or reserve stations are provided in addition to the stations required to achieve the machine output. Preferably, this spare or reserve station includes a handling device and at least one treatment station.

It is advantageous that this reserve station is not activated during normal operation. Preferably, the reserve station is only activated in case of failure/defect or the need for maintenance of a station, while the respective station is deactivated. The advantage is that the production operation can thus be maintained at 100% output, as the number of producing stations remains the same. In addition, the station that is at a standstill can be maintained while the remaining stations continue to produce, which means a considerable increase in machine performance compared to a complete machine standstill (as would be necessary with carousel machines, for example).

In order to maintain a uniform wear across all stations, the reserve station can preferably also be moved dynamically. For example, station a pauses one hour, station b pauses the next hour, etc.). Thus all stations have approximately the same running time over a longer period of time.

In an alternative embodiment, the apparatus is also equipped with one or more stations more than would actually be necessary to achieve the desired machine output. This means that even with this embodiment the apparatus is oversized to a certain extent. For example, in an embodiment in which each station can handle 2000 containers per hour (bph) and the desired machine output is 40,000 bph, the machine can be equipped with 21 instead of 20 stations. In normal operation, all 21 stations then run at a reduced output of approx. 1905 bph. If one station fails, the output of the remaining 20 stations is increased to 2000 bph. Thus the machine performance can still be at 40000 bph.

The containers may in particular be beverage containers, plastic containers, preforms, glass containers, cans and the like.

In an advantageous embodiment, the apparatus has a second transport device for transporting containers, which is at least in sections a linear transport device. Advantageously the first transport device can be switched off at least temporarily, so that the supply of containers to the treatment station is interrupted. The second transport device is preferably suitable for transporting the containers from an infeed starwheel to an outfeed starwheel even if the first transport device is switched off.

This allows production to continue even if the containers are not to be treated by the treatment stations, for example because the containers are not to be coated in the treatment stations. It is therefore possible to shut down the treatment station where the containers are coated and still continue to transport containers. This makes it particularly easy, for example, to carry out maintenance on parts that usually move during a production operation with coating. For example, it can be ensured that rotating carriers, to which one or more treatment stations for coating are assigned, do not continue to rotate. It is therefore proposed to pass containers past the device for coating containers using a bypass.

In an advantageous embodiment, there is a transfer point between the first and the second transport device on which containers can be transferred from the first to the second and/or from the second to the first transport device. In a particularly preferred embodiment, containers can be transferred from the second to the first transport device at the transfer point and at substantially the same transfer point containers can be transferred from the first to the second transport device. The term "substantially" is understood that also embodiments are included in which the transfer takes place slightly offset from each other.

The first and the second transport device are advantageously arranged in relation to each other in such a way that the containers can first be conveyed a distance by the second transport device, then transferred to the first transport device at the transfer point, conveyed by the first transport device, and finally transferred to the second transport device again at the transfer point and further conveyed by it.

Advantageously, the transfer point can be deactivated at least temporarily so that the containers are not transferred to the first transport device when the transfer point is deactivated, but remain on the second transport device and can be transported further by the latter.

In a further advantageous embodiment, the second transport device is also a turning device for turning the containers. The containers are advantageously turned by the turning device by guiding the containers along a curved section of the transport device.

Turning the containers means that the containers are turned from an upright position to an inverted position and/or from an inverted position to an upright position. An upright position is a position in which the bottom of the container is facing downwards and/or a container opening is facing upwards, the directions of the container being understood in relation to gravity. An inverted position is a position of the container with a bottom facing upwards and/or a container opening facing downwards. The inverted position is, in particular, a position rotated 180° from the upright position.

In a preferred embodiment, the second transport device is designed to be circumferential. The second transport device preferably has a linear section along which the containers can be moved along a linear transport path. Advantageously, the transport device also has at least one, preferably two, curved sections. It is advantageous that the linear and the curved section(s) are arranged in a plane to each other which would run approximately through the centre of the earth, i.e. in a plane which is substantially perpendicular to a horizontal plane. It is therefore advantageous for the curved sections to lead downwards or upwards (in relation to gravity).

Preferably, the second transport device is designed in such a way that the containers can be moved along the linear section as well as at least one curved section, particularly preferably two curved sections. Advantageously the containers can be turned on the second transport device by moving them along a curved section.

However, other forms of turning operations are also conceivable. For example, the transport device could also have clamps that can be turned. A turning operation can also be carried out advantageously during transport on a linear transport path.

In an advantageous embodiment, the first and/or second transport device is a continuously operating transport device, i.e. a transport device which transports the containers continuously. In an advantageous embodiment, the containers are transported at a constant speed. In an advantageous embodiment, however, continuous transport can also be understood to mean that the containers are transported at a variable speed. In particular, it is also possible that individual containers are accelerated or decelerated.

In an advantageous embodiment, the second transport device has a long stator linear motor. The second transport device advantageously enables an individual container transport. The second transport device is advantageously suitable for varying the speed of individual containers. The second transport device is particularly preferably suitable for changing the distance between individual containers (so-called spacing).

In an alternative embodiment, the second transport device is a chain- or belt-based system. In this embodiment, the containers advantageously are also transported individually by a plurality of transport units. In this embodiment, the containers are preferably conveyed by the second transport device at a constant speed without varying the distances between the individual containers.

Particularly preferably, the containers can be guided by the second transport device initially along a curved section so that the containers are turned over. The second transport device is preferably designed in such a way that the containers can first be picked up in an upright position and then turned into an inverted position by the curved section. Preferably, the transfer point is located in the area of the linear section. The transfer point is advantageously located in an area where the containers are transported in an inverted position with the opening downwards. The second transport device is preferably designed in such a way that after the transfer point, the containers are again transported along a curved section and turned back into an upright position.

In an advantageous embodiment, the apparatus has at least one, preferably two, distribution delay starwheels. Advantageously one distribution delay starwheel is arranged upstream of the first transport device and a further distribution delay starwheel downstream. It is advantageous that the distance between the containers can be changed by the distribution delay starwheels in such a way that only every nth, preferably every second, transport unit on the transport device is occupied.

In an advantageous embodiment, a distribution delay can be achieved by means of a long stator linear motor (LLM). This can be advantageously designed as a at least in sections linear transport device. The LLM can advantageously also include curved sections.

Preferably, the LLM can also be designed as a transport starwheel. In this embodiment, the containers are turned particularly preferably outside this LLM transport starwheel. Thus, for example, it would be possible that the containers are turned for the first time on the first transport device after passing through the first LLM transport starwheel. For this purpose, the first transport device can have tongs with a turning unit, for example. In this case, a second turning, back to the original position, is preferably also carried out on the first transport device before the containers are transferred to a second LLM conveyor starwheel.

However, it would also be conceivable that the distribution delay takes place on an LLM transport starwheel, but the turning is carried out on the second transport device, which is designed as a turning chain. Here the containers are transferred from a first LLM transport starwheel to the turning chain, and first pass through a curved transport path upwards or downwards, by which the containers are turned thereby. Then they can be transferred from the turning chain to the first transport device at a transfer point. After passing through the first transport device, the containers are transferred to the second transport device again and pass through a curved transport path again, where they are turned again before they are transferred to a second LLM conveyor starwheel.

Alternatively, turning can also be carried out on the infeed and outfeed starwheels. Here it is possible on the one hand to carry out the turning on a distribution delay starwheel. However, it is also possible to combine a distribution delay starwheel with an additional infeed or discharge starwheel on which the containers can be turned.

However, with all embodiments, it is preferable to ensure that the container turning process takes place both before and after a transfer to treatment stations. Therefore, the containers are preferably always turned before they are transferred to a treatment station. The containers are preferably turned from an upright position to an inverted position, so that the containers are handled in an inverted position. It is advantageous to turn the containers again after they have left the treatment station. It is preferable to turn the containers so that they return to their original position before the first turning operation, particularly preferably an upright position.

In a preferred embodiment, the handling devices and/or the treatment stations can be switched off at least temporarily and the containers can preferably be transported along the transport device without being transferred to the treatment stations. The treatment station can be switched off advantageously. For example, vacuum pumps, drives for coating lances and pumps for the coating gas can be switched off in a coating device. Preferably, all valves can also remain closed.

Advantageously the containers are transportable along the transport device without being taken over by the handling devices.

The transfer positions between the transport device and the handling devices are preferably deactivated so that the handling device is not actuated and the containers can be moved past the handling devices. A special mover can be provided for this purpose, which can move past the transfer positions between the transport device and the handling devices and deactivate the transfer mechanism. The apparatus may also have an activation mover. The activation and deactivation mover may be the same mover or different movers. It is advantageous to park the mover or the movers on a parking level when they are not needed.

In this embodiment, the transport device is preferably designed as an LLM stretcher. However, it can also be advantageous for the transport device to be a chain. If it is a chain, where the distance between the transport units cannot be varied, a transfer unit and further devices such as a filler can be moved via an electronic gear.

A positive side effect of this embodiment is that the apparatus in this way can also act as a buffer to compensate for differences in output between an upstream machine, such as a blowing machine, and a downstream machine, such as a filler or a labeller.

If a mechanical forced control is provided, which forces the containers into the handling devices and/or treatment stations, the containers can also take this prescribed transport path and simply not be treated in the treatment station, for example not coated, and then discharged again.

In a further advantageous embodiment, the handling device has at least two handling units, each of which is suitable for receiving a container, wherein the handling units being arranged on a common carrier and being interchangeable together with this carrier. It is advantageous if the common carrier is a rotating carrier.

In a further advantageous embodiment, the treatment stations have a container-independent receiving unit with a locking lever, which can be connected to a container-specific process unit via an adapter. It is advantageous that the adapter with the process unit arranged on it can be inserted axially into the receiving unit. Preferably, a guided feed movement of the adapter is possible by means of the locking lever and the adapter and the receiving unit can be fixed to each other by means of this, wherein seals of media conductors and/or electronic contacts are produced during the guided feed movement.

This quick-change and locking mechanism is particularly advantageous for internal coating lines for plastic bottles. In such a case, the process unit consists advantageously of a gas lance and ignition electrodes, which are clearly connected and thus form an independent unit, and is container-specific. Here it is advantageous to fix the container-specific process unit by means of the quick-change and locking mechanism in one-hand operation. The quick-change and locking mechanism creates a seal between the process chamber and the environment and removes it again. A seal between one or more media inlets or outlets and the environment is also created or removed. In addition, the electrical power supply for the process unit can also be created or released.

Such a change can be done manually, semi-automatically or automatically

The process unit is advantageously assembled axially with the adapter, which is independent of the container. Rotation is preferably restricted by positive locking and enables the exact positioning of the plug contacts. Axial means a direction in the longitudinal direction of the process unit.

For a clearly defined connection and in order to avoid possible angular errors or slanted seating, the connection between the process unit and the adapter is preferably also provided with a screw cap, for example in the form of a union nut. The union nut is advantageously provided with a spanner flat as well as with a knurl for tool-free joining and loosening.

It is advantageous to have at least one media channel on the adapter. It is advantageous that the at least one media channel and the chamber have seals. Preferably the seals are integrated in the form of O-rings on the adapter in radial sealing design. It is advantageous that the seals for the chamber and media supply are attached to the adapter, which is designed as an interchangeable part. This allows easy replacement of the seals. Advantageously, hereby an intuitive operation can be achieved and changing without tools is possible. The design preferably also prevents incorrect connection by mixing up the contacts.

In an advantageous embodiment, several media channels can be merged into a single one in order to reduce the number of sealing points. Sealing levels can be arranged with parallel shifts to make the joining forces for the seals and thus the force-angle curve for the locking lever more uniform.

Advantageously, the receiving unit is substantially a cuboid body. Advantageously, the receiving unit has an opening on one side facing the treatment chamber (hereinafter referred to as "top"). It is advantageous that the process unit can be guided through this opening. It is advantageous that the receiving unit also has an opening on the opposite side (referred to as "bottom") or is open. The opening on the lower side is advantageously large enough for the adapter to be inserted and a lower side of the adapter can be sealed with the receiving unit.

Preferably, the locking lever is located on walls of the receiving unit, which are between the upper and lower side of the receiving unit ("side walls"). Preferably the locking lever is rotatably mounted. The locking lever has advantageously two locking positions. One of these positions is a position in which the locking lever, when assembled, is approximately in extension with the process unit and below the lower side of the receiving unit. Preferably, this is a "closed" position in which the receiving unit and the adapter are connected to each other. The second locking position is advantageously an "open" position in which the receiving unit and the adapter can be separated from each other. Advantageously, in the "open" position the locking lever is in a position that is substantially perpendicular to the "closed" position.

Preferably, the locking lever has a spring-loaded element through which the locking lever can engage. It is advantageous that the locking force is adjustable. It is also possible that end stops or a guide contour with end stop function is provided for the locking lever.

It is advantageous to connect the adapter and the receiving unit with the quick-change and locking mechanism after the process unit and the adapter have been connected, in particular in the manner described above.

It is advantageous for the locking lever to be in the "open" position for this. It is preferable to insert the adapter axially into the receiving unit. An initial rotation possibility is preferably blocked by appropriate shaping after a sufficient joining distance.

Preferably, the adapter has at least one, preferably two guide pins. Preferably, the locking lever has a guide groove. It is advantageous to arrange the guide pins in such a way that they are inserted into the guide groove of the locking lever during the axial feed of the adapter and receiving unit.

The adapter is advantageously fixed in a predetermined area by a latching mechanism. This area can preferably be overcome and released from the fixation by applying a defined force. The latching force is advantageously adjustable. Due to the pre-fixing (latching function), the position in the room no longer has any influence (gravity). Advantageously, hereby a one-hand operation and/or robot-assisted changing, for example by a 6-axis robot arm with 2 gripper fingers, is possible.

Preferably, the locking lever can now be transferred from the open to the closed position. This results in a guided feed movement, in which the adapter is preferably fixed with the receptacle and/or the radial seals penetrate advantageously into the receptacles and/or the electrical contacts are plugged in. It is advantageous that the sealing and the electrical contacts are automatically established during the fixing. When the fixing is released, the seal and the electrical contacts are advantageously released automatically. Several functions are thus advantageously carried out simultaneously by operating the locking lever and thus the quick-change and locking mechanism in one-hand operation: Fixing, sealing and contacting.

The cam mechanism can be designed to be self-locking, preferably in the closed position.

The release process is preferably carried out analogously in reverse order.

An advantage of this embodiment is that the joining and releasing process between adapter and receptacle can be carried out with one hand (one-hand operation). This is particularly advantageous in case of possibly unfavourable accessibility, limited installation space or random installation orientation in the room. A further advantage is that the seal is easily accessible, easy to change and consists of standard components.

Due to the appropriate shaping, the adapter can preferably not be inserted incorrectly (pre-alignment by axial guiding with rotation possibility, wherein the rotation is then blocked by a further axial insertion of the adapter into the receptacle).

In an advantageous embodiment, the containers are moved in a direction perpendicular to the transport path P of the containers by means of support elements. Preferably, the movement can be vertically down or vertically up. The terms "down" and "up" are preferably to be understood in the direction of gravity. It is advantageous that this direction corresponds to a longitudinal direction of the transported containers. This preferably also includes that the containers are transported with an opening downwards (relative to gravity). With such an orientation, a movement downwards (relative to gravity) would thus mean a movement in the direction of the opening of the containers, i.e. in the direction which is usually referred to as "up" relative to the container geometry.

In a preferred embodiment, a locking element is arranged on the support element. This locking element is advantageous for airtight sealing of the treatment station. In particular, the closing element is preferably suitable for airtight sealing of a vacuum chamber of the treatment station.

In a preferred embodiment it is an apparatus for coating containers with at least one vacuum device for generating a vacuum, with at least one treatment station for coating containers with a plasma, wherein the treatment station is in fluid connection with the vacuum device and wherein the treatment station comprises at least one treatment device which can be inserted into a container, with a conveyor device for transporting containers on a transport path P and with at least one support element for receiving at least one container.

Preferably, the support element is movable in a direction different from zero to the transport path P of the containers and is suitable for introducing the container into the treatment station, wherein a locking element is arranged on the support element and the locking element is suitable for closing the treatment station in a substantially airtight manner.

The term "substantially airtight" means that only a slight gas exchange can take place. The gas exchange should preferably be so low that it is negligible when evacuating the treatment station.

The terms "introducible" or "to be introduced" are always to be understood as relative movement of the respective elements. This includes both the elements (e.g. the treatment device and a container) both moving towards each other, but also that one of the elements rests while only the other moves. With regard to the movement of only one element, in particular both variants are included, i.e. both the movement of the 1st element (e.g. the treatment device) and that of the 2nd element (e.g. the container), while the other element is at rest.

The support element is suitable for holding at least one container and includes devices designed for this purpose (hereinafter also referred to as receptacles), for example clamps or other container holding devices. Typically, these container holding devices or clamps are arranged in such a way that they can be used for container treatment in the treatment station, i.e. they do not impede container treatment. In particular, the clamps can be passive, i.e. they can remain in their respective state, i.e. open or closed, without any external influence, so that switching between open and closed state is only necessary for switching over. In particular, such passive clamps can then hold the containers by themselves. In other embodiments, actively controlled clamps can also be used which must be kept actively closed and are open without any influence, or vice versa, i.e. clamps which must be kept actively open and are closed without any influence. The holders can optionally be height adjustable so that they can be used for containers of different sizes.

In a preferred embodiment, the conveyor device is suitable for moving the containers along a circulating transport path. It is advantageous for the conveyor device to move the containers along a transport path that is curved at least in sections. The conveyor device preferably has a rotating carrier. It is advantageous for the conveyor device to have a rotating carousel with holders for the containers arranged along a pitch circle at regular intervals to each other. The conveyor device is preferably a rotary machine.

Preferably, the conveyor device can be the handling device described. The apparatus described here for coating containers is therefore particularly preferred used with the apparatus described above for treating containers with at least two handling devices.

Advantageously, more than one treatment station can be assigned to a conveyor device or handling device.

In a preferred embodiment, the treatment station is located below or above the transport path P of the containers. It is also possible that the treatment stations are not arranged directly below or above the transport path, but laterally offset to it. Thus, for example, it would be possible for the treatment stations to be offset radially outwards or even inwards if the transport path is at least partially circular. For example, the treatment stations below the transport path could be offset radially outwards.

Preferably, the support element is movable in a direction perpendicular to the transport path P of the containers. The preferred movement of the support element for introducing the container into the treatment station is downwards or upwards. The treatment stations are particularly preferably arranged under the transport path of the containers, and the movement of the support element for introducing the container into the treatment station is preferably downwards. The support element is advantageously designed to transport the containers with their opening downwards. The preferred movement of the support element for introducing the container into the treatment station is in the longitudinal direction of the container. The movement is particularly preferred downwards in relation to gravity, but upwards in relation to the container geometry, i.e. in the direction of the container opening.

It is also possible that there is a movement downwards or upwards as well as a movement in a lateral direction to the transport path. This is necessary, for example, if the treatment stations are located below the transport path and are offset radially outwards. For this purpose, the apparatus comprises a lifting-turning device. This lifting-turning device is advantageously suitable for removing containers from the conveyor device. The lifting-turning device preferably takes a container from the conveyor device and swivels it above or below the treatment station. The container is advantageously lowered or lifted into the treatment station by the lifting-turning device. The lifting-turning device can also perform this movement sequence advantageously in the opposite direction. The lifting-turning device is thus advantageously suitable for lifting a container out of the treatment station or lowering it out of the treatment station and swivelling it to the conveyor device. The lifting movement can advantageously be carried out with the aid of a linear motor.

In an advantageous embodiment, the locking element is rigidly arranged on the support element. It is advantageous if the locking element is arranged immovably on the support element in a longitudinal direction of a container. It is advantageous that a fixed arrangement of the locking element on the support element ensures that a movement of the support element leads to an identical movement of the locking element. In particular, this ensures that when the support element is moved up or down, the locking element is moved up or down over the same distance. In this way, a movement of the support element in the direction of the treatment station can lead to that the locking element, which is also moved, being applied to the treatment station in a sealing manner.

In a preferred embodiment, the apparatus has at least one sealing element. This sealing element is advantageously positioned between the treatment station and the locking element. Preferably, each treatment station or locking element has at least one sealing element. It is advantageous that the sealing elements can have random profiles and have an elastic material on their sealing surfaces. The elastic material can be in particular rubber, silicone or the like.

In a preferred embodiment, the vacuum device is suitable for creating a negative pressure of less than 100 mbar in the treatment station, preferably less than 10 mbar and particularly preferably less than 1 mbar. A pressure range of 0.1-1 mbar is particularly preferred to be set by the vacuum device.

In a preferred embodiment, the treatment device is immovably arranged in the treatment station. It is advantageous that only the container moves during the insertion movement of the treatment device into the container, while the treatment unit rests advantageously.

Advantageously, the treatment device is an elongated, rod-shaped element, in particular a lance. Preferably the treatment device has openings. Preferably, a flowable medium can be introduced into the containers by these openings. Preferably, this flowable medium is a gas suitable for the plasma process. This gas can advantageously be a mixture of a silicon-containing precursor and oxygen, in particular for PECVD (=plasma enhanced chemical vapor deposition) with silicon oxide. However, other gases are also conceivable, for example acetylene for the deposition of so-called DLC layers. For plasma sterilisation, for example, argon and water vapour can be introduced into the containers.

This gas is distributed homogeneously inside the bottle.

The treatment unit is advantageously used as an electrode for plasma generation. The energy which is to ignite the plasma can then be coupled into the system in the form of high frequency via this treatment device.

The treatment station preferably has a second electrode. This electrode can advantageously be located outside the container, but advantageously also inside the container. This second electrode can be earthed or floatably connected to the first electrode.

With an alternative preferred embodiment, it is possible to dispense with the treatment unit serving as an electrode for plasma generation. Advantageously, such an embodiment has a device for generating an electromagnetic field. Advantageously, the device is suitable to generate an electromagnetic field which is suitable to ignite a plasma in the introduced gas. This generated electromagnetic field can be a high-frequency field, for example, but also a microwave, for example. It is advantageous if this device is located outside the container. The electromagnetic field is therefore preferably irradiated into the container from outside the container.

In an advantageous embodiment, the treatment station has a valve with which the treatment station can be ventilated, in particular after the plasma process has ended.

The present invention is further directed to a method for treating containers, in which a transport device transports the containers and in which a handling device in a transfer area takes over a predefined number of containers from the transport device, moves them on a transport path and delivers them in a discharge area to the transport device or a further transport device, wherein at least one further handling device in a further transfer area takes over a predefined number of containers from the transport device, moves them on a transport path and delivers them in a further discharge area to the transport device or to a further transport device, wherein the handling devices transport the containers on the transport path in each case to at least one treatment station assigned to the handling device.

According to the invention, the transport speed of the handling devices is controlled in such a way that the transport speed of the handling devices during transfer and/or discharge of the containers is synchronised with the transport speed of the transport device and/or the further transport device and the transport speed of the handling device is reduced after the transfer of the containers.

In particular, the apparatus described above is suitable and intended to carry out the method described, i.e. that all the features carried out for the apparatus described above are also disclosed for the method described here and vice versa.

A preferred procedure is for example as follows: The handling device is initially in a rest position. As soon as the containers to be handled by it approach on the transport device, the movement of the handling device starts. Advantageously, this is a rotational movement. The handling device takes a defined number of containers from the transport device and stops rotating at the treatment stations. It is advantageous that the containers are moved exactly so far that each container is assigned to a treatment station. The term "assigned" means that the container is located in the immediate vicinity of a treatment station, for example directly above, below or next to it. It is advantageous for the handling device to introduce the containers into the treatment stations and/or the treatment stations take the containers from the handling device.

Once the treatment is complete, a movement can be made to remove the containers from the treatment station. However, such a movement need not be absolutely necessary. With a filling valve, for example, such a movement is not necessary if the container only has to be held under a discharge opening. Then the rotary movement starts to discharge the treated containers to the transport device and to pick up new untreated containers from the transport device. The cycle now starts again.

For this system to function properly, it is very important to determine the cycle sequence of the handling devices appropriately. Otherwise it can happen that a handling device wants to transfer a finished container to the outlet, but this is not possible because the suitable space is already occupied by another container that was previously discharged. This results in a loss of time and thus a reduction of machine output.

To avoid this, a suitable pattern must be selected according to which the handling devices are switched. The advantageous requirement for a suitable pattern is: All containers must be removed from the transport device at the end of the infeed section—i.e. at the latest at the last handling device.

The switching sequence of the individual handling devices is preferably selected so that they are distributed as evenly as possible during use. Ideally, there should always be the same time interval between the cycles.

In a preferred method, the containers are moved at constant speed on the transport device and/or a further transport device. It is advantageous that a continuously running stream of containers runs in and out of the device, while only the treatment is clocked/stationary. This has the advantage that a clocked treatment of containers is possible, but at the same time a problem-free integration into a (continuously running) production line is possible.

It is advantageous to transfer the containers to the handling devices from the infeed, preferably running at constant speed, or to discharge them into the outlet, preferably running at constant speed.

However, it is also conceivable that the speed of the transport device varies, e.g. to compensate for gaps in the container flow or to bring the containers into a certain division pattern. A possible dividing pattern can preferably be created either before the apparatus, in an infeed starwheel or in the transport device.

Preferably, however, the transport speed is constant from the first transfer area, i.e. from the transfer area located furthest upstream, since this is where the handling devices begin with container removal. However, it is also conceivable that the speed is also varied on this section. In particular, acceleration phases can be inserted to save time. These acceleration phases are advantageously located between the transfer areas so that the containers in the transfer area are not subjected to any acceleration. Preferably, the speed of the containers in each of the transfer areas is identical.

In an advantageous method, the speed of the handling devices is reduced to a standstill. The handling stations treat the containers advantageously during standstill. The movement, in particular a rotation, of the handling device is preferably stopped when the container or containers have been removed from the container flow of the transport device (infeed) and brought out of the collision area with the following containers. The term "collision area" refers to the area in which the following containers, which are conveyed further by the transport device, can at least come into contact with containers in the handling device.

In special cases it may also be useful not to delay the (rotational) movement of the handling device completely until it comes to a standstill, but instead to pass the treatment station at a reduced speed.

When the treatment process is finished, the handling device is set in motion again and synchronised with the outlet section of the transport device. This can either be the outlet part of the original or of a further transport device. At the discharge point, the container(s) are then discharged to the transport device. The treated containers leave the machine via the transport device.

In an advantageous method, not every transport unit of the transport device transports a container. Preferably, only every nth transport unit is loaded on the transport device. This is particularly preferably every second transport unit. Thus, there is one (or possibly several) empty transport units between each loaded transport unit. The transport units can in particular be neck-handling clamps The fact that only every nth transport unit is loaded increases the line speed, which on the one hand enables a faster transfer, and on the other hand permits container transfer and discharge at only one point.

This means that if, for example, only every second clamp is loaded in the transport device, the web speed is doubled for the same machine output. Therefore, the handling devices can pick up and discharge the containers faster. Since the rotational speed is increased, the time required for one rotation is reduced. In this way, a higher machine output is possible.

This process is preferably carried out in a design in which the delivery area of a handling device is spatially identical to the transfer area of a handling device.

Advantageously, the transport units which transport the containers before the containers are transferred to the handling devices are transport units which are different from the transport units which transport the containers after the containers have been discharged from the handling devices.

At the transfer or discharge points between the handling devices and the transport device, a container is thus always alternately picked up and discharged during container transfer. Therefore, each handling device only has to rotate once to discharge its treated containers and to pick up new containers.

Alternatively, it would also be conceivable, accepting a longer transport time, for each handling device to make a rotation while discharging the treated containers and then a further rotation to pick up the new containers. However, this would reduce the efficiency of the handling device, since the transport time is enlarged compared with the handling time.

Due to the loading of only every nth transport unit and the simultaneous transfer and discharge of containers at the transfer point to the handling devices, the handling devices must preferably have more handling units such as handling stations. It is advantageous for the handling devices to have n times as many handling units as treatment stations, preferably twice as many.

Preferably, the containers are taken over alternately by other handling units of a handling device during each cycle. If the handling units of a handling device were numbered consecutively, for example, the even-numbered handling units would be loaded with containers in a first cycle, the odd-numbered handling units in a second cycle, the even-numbered handling units again in a third cycle, etc.

However, since the treatment stations are stationary arranged in the apparatus, the handling device can preferably take up several, preferably two, rest positions. The rest positions are preferably approached alternately with the cycles. It is advantageous that the rotary movement of the handling devices comes to a standstill during each cycle in such a way that the containers are in the immediate vicinity of the treatment stations. In the concrete application, where every second transport unit and every second handling unit is occupied, the handling devices have two positions which are alternately approached with each cycle in order to be able to place the containers in the treatment stations.

Here, one of the handling devices preferably has one handling unit less than the other handling devices. This is advantageous so that a continuous container flow with alternating full-empty loading is also produced at the outlet of the transport device. It is advantageous that the handling devices insert the treated containers into the transport device alternately before and after the untreated containers during each cycle. To compensate this change advantageously, a handling device with a reduced handling unit is required.

In an advantageous method, the containers are transported to the discharge area immediately after completion of the treatment process by the handling device assigned to this treatment station. Preferably, the circuits of the handling devices and the transport device are coordinated with each other in such a way that each handling device can immediately transfer its treated containers to the transport device after completion of the treatment process and can pick up new containers, so that no unnecessary waiting times occur.

It is advantageous that the containers are transferred back to the transport device after completion of the treatment without time delay, so that a continuous container flow leaves the apparatus at the outlet of the apparatus. Advantageously, the container flow only has gaps at the outlet of the apparatus if the infeed already has gaps. Even if the infeed already has gaps, it is conceivable that these gaps in the container flow are compensated to a certain extent. For this purpose, for example, the use of a long stator linear motor as a transport device is considered.

It would also be possible to integrate a rejection of "bad containers". In case of containers to be rejected, they are preferably not taken over by a handling device, but transported to the end of the infeed section. The containers can then be rejected at this point.

In a preferred method, the containers are fed into the apparatus in the same order in which they leave it.

Preferably, the distance between the individual containers and/or between batches consisting of several containers can be changed. It is advantageous to increase the distance between the batches at a low output.

In an advantageous method, the handling device can perform a lifting movement of the containers in addition to the transport movement. Preferably, a handling device contains a star/carousel which can perform a rotary and lifting movement. Both movements take place in a clocked manner.

Such a lifting movement is advantageous for a container coating machine or a sterilisation device, for example. In a container coating machine, empty (plastic) containers are preferably coated on the inside to reduce gas permeability.

Advantageously, a container is dipped by a lifting movement into a vacuum chamber of the treatment station in which the coating process is carried out.

A preferred method is as follows in the case of an internal container coating: When the container or containers have been removed from the container flow (inlet) and brought out of the collision area with the following containers, the rotation of the handling device is stopped. Then a lifting movement (optionally a lifting or lowering movement, depending on whether the treatment station is located below or above the handling device) is carried out to feed the containers to be coated into the treatment chamber. Now the coating process is carried out. The coated containers are then lifted or lowered out of the chamber again. It is also conceivable that the lifting or lowering movement does not follow the rotational movement but is slightly superimposed on it.

In the case of internal container coating, the handling device preferentially removes the untreated containers from the transport device and places them in one or more vacuum chambers in which the actual coating process takes place, since this must take place under certain ambient conditions, for example in a vacuum. It is advantageous to evacuate the vacuum chamber after the container has been inserted. An exemplary sequence of process steps could look as follows:

0.5 seconds: Placing the container in the chamber (e.g. by lowering it)

2 seconds: Evacuation of the chamber 5 seconds: Coating process 1 second: Venting 1.5 seconds: Removal of the container from the chamber and discharging of the coated container and loading of the station with new containers.

The duration of a cycle in this example is approx. 10 seconds. It is easy to see that the vacuum pump is only needed in 20% of the time (2 of 10 seconds). The rest of the time it is inactive.

This can be advantageously avoided by having several handling devices share one vacuum pump. However, this requires a correspondingly favourable cycle sequence of the handling devices. For example, it would be bad if handling device a started the cycle at time 0 s and handling device b, which shares a vacuum pump with handling device a, at time 1 s. This is because at time 1 s, handling device a is not yet completely evacuated. If the vacuum pump is now connected to handling device b at 1 s, the vacuum in handling device a deteriorates again, i.e. the pressure increases. In this way, no reliable evacuation can take place.

For this reason, the switching sequence of the handling devices is advantageously selected in such away, so that the stations do not require the vacuum simultaneously/overlapping, but at a suitable time interval. The switching sequence and the switching times should therefore preferably be selected in such a way that the vacuum pump(s) are used as evenly as possible.

The vacuum pump(s) can be utilised as evenly as possible by selecting the appropriate geometric conditions and switching sequence of the handling devices depending on the machine output (container throughput per hour), the container pitch (distance between the containers on the transport device), the number of handling devices in the machine, and the number of different cycles.

Preferably, this is a method for coating containers, in which the container is transported along a transport path P by means of a transport device, is introduced into a treatment station by means of a support element in a non-zero direction to the transport path P and a treatment device is introduced into the container, wherein the treatment station being evacuated in a next step and the container being coated with a plasma.

Preferably, a locking element arranged on the support element is moved towards the treatment station and the locking element seals the treatment station essentially airtight.

It should be noted that this method may also be used independently of the method described above. The applicant therefore reserves the right to claim protection for this procedure as well.

In particular, the apparatus for coating containers described above is suitable and intended to carry out this described method, i.e. all features designed for the apparatus for treating containers described above are also revealed for the method described here and vice versa.

It is advantageous to move the locking element towards the treatment station due to the movement of the support element.

The container is advantageously coated with plasma, in particular on the inside. For this purpose, a gas is introduced into the interior of the container via a treatment unit. A gas suitable for the plasma process is preferably introduced into the bottle and distributed as homogeneously as possible inside the bottle. The gas introduced into the interior of the container is preferably ignited, so that a plasma is created. For this purpose, for example, an electrode can be inserted into the container. The energy to ignite the plasma can then be coupled into the system in the form of high frequency via this electrode.

While the container is being subjected to plasma treatment, the waste gas produced is pumped out permanently. It is advantageous that the treatment station is ventilated via a valve after the plasma process is completed.

In a preferred method, the container is removed from the treatment station at the end of the coating process using the support element. Preferably, the container is lowered into the treatment station for treatment with the aid of the support element and lifted out of the treatment station after treatment.

In an advantageous method, two vacuum pumps are used for evacuation. The first pump evacuates the vacuum chamber to a first pressure level. The second vacuum pump evacuates the vacuum chamber preferably to a second pressure level which is below the first pressure level. Advantageously, the second pressure level corresponds to the pressure level at which the actual coating process takes place. In this way, the required evacuation time is advantageously divided between two pumps one after the other. In the example shown, each pump evacuates preferably only for about 1 second.

Further advantages and embodiments are shown in the attached drawings:

In the drawings:

FIG. 13b shows a table with a favourable switching sequence for the example shown in FIG. 13a;

FIG. 14b shows a table with a favourable switching sequence for the example shown in FIG. 14a;

FIG. 15b shows a table with a favourable switching sequence for the example shown in FIG. 15a;

Figure 1:
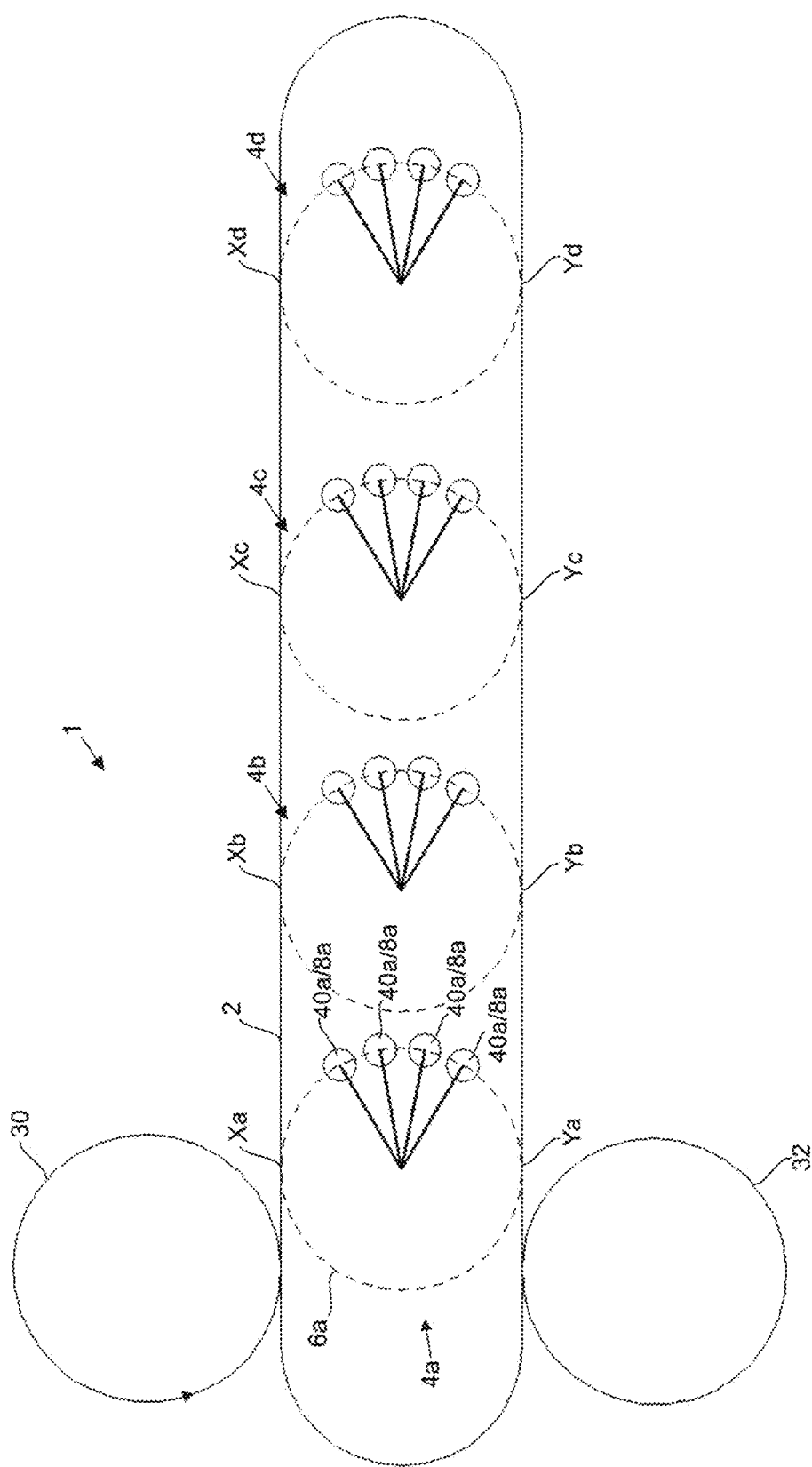
FIG. 1 shows a schematic representation of an embodiment of an apparatus according to the invention.

Identical reference signs are used for elements of the invention which are identical or have the same effect. Furthermore, for the sake of clarity, only reference numbers in the individual figures are used which are necessary for the description of the respective figure. The embodiments depicted in the drawings are only examples of how the apparatus and method according to the invention can be designed and do not represent a final limitation of the invention or inventive thoughts.

FIG. 1 shows a schematic representation of an embodiment of an apparatus 1 according to the invention 1. Therein a transport device 2 is shown which can transport containers 10 (not shown). The containers are transferred from the infeed starwheel 30 to the transport device 2. The apparatus 1 has several handling devices 4. The handling devices are marked with the additional reference signs a-d for better differentiation. Thus the reference sign 4a refers to the handling device which is closest to the infeed starwheel, i.e. which is located furthest upstream. 4b identifies the subsequent handling device, 4c the third handling device and 4d the fourth and last handling device. While the reference symbol 4 with the letter addition thus designates a concrete handling device, the reference symbol 4 generally refers to the handling devices without differentiating between the concrete handling devices. The same applies to other reference signs, some of which are used with letter addition and some of which are not.

Each handling device has a rotatable carrier 6. For reasons of clarity, only the carrier of the handling device 4a is marked with the reference sign 6a. Each handling device 4 also has several, in this case four, handling units 40, each of which is suitable for holding one container 10. For reasons of clarity, only handling units 40a of handling device 4a are marked with a reference sign.

In FIG. 1, the handling devices 4 are in a position in which the handling units 40 are each located in the immediate vicinity (for example above) of the fixed treatment stations 8 of the respective handling devices. For example, handling device 4a has four treatment stations 8a, which are located directly below the handling units 40a and are not shown separately.

Each handling device 4 also has a transfer area X and a discharge area Y. In the transfer area X, containers 10 can be transferred from the transport unit 2 to the handling devices 4. In the delivery area Y, containers 10 can be transferred from the handling devices to the transport device 2.

In a method according to the invention, four containers 10 are thus preferably transferred to the handling device 4a in transfer area Xa. The 10 containers following these containers are conveyed further by the transport device 2—preferably at continuous speed. Containers are also transferred to handling devices 4b, 4c and 4d in the transfer areas Xb, Xc and Xd. Here it is possible, but not mandatory, that the containers are transferred to the handling devices in ascending order. It is also conceivable, for example, that containers are transferred to the handling device 4b first, then to 4d, then to 4c and finally to 4a. It is also possible to transfer containers to several handling devices 4 simultaneously. However, the cycle sequence is advantageously always the same, i.e. the sequence in which containers are transferred to the handling devices is preferably the same. To ensure that all containers are treated, the cycle sequence must be selected in such a way that the containers are transferred to the last handling device (here 4d) at the latest. According to this, the transport device 2 should preferably not contain any containers at the curvature on the right-hand side of FIG. 1.

After the containers 10 have been transferred to a handling device 4, they are transported to the treatment stations 8 by means of the clockwise rotating carrier 6 and treated there. After treatment, the containers 10 are transported further by the handling device 4 to the discharge point Y, and transferred there to the transport device 2. It is advantageous that the treatment in the treatment stations 8a-d takes the same length of time. Accordingly, containers 10 which were transferred to a handling device 4 at an earlier time are also discharged at an earlier time than containers which were transferred at a later time.

Figure 2:
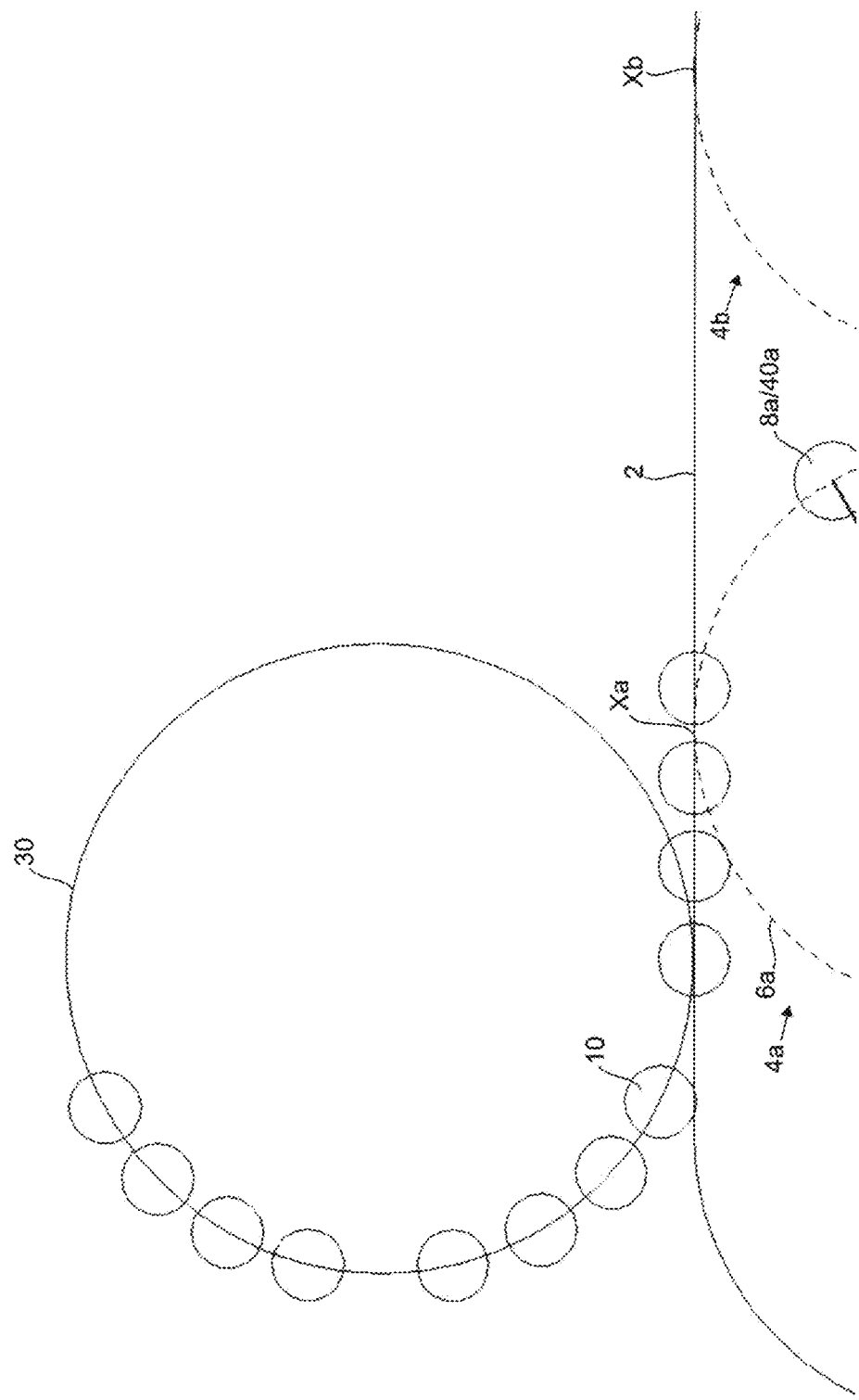
FIG. 2 shows an enlarged representation of the transfer area.

FIG. 2 shows an enlarged section of the infeed starwheel 30 and the transfer areas Xa and Xb. Additionally, a section of the transport device 2 can also be seen. From the infeed starwheel 30 containers 10 are transferred to the transport device 2. The containers 10 are each grouped together in groups (batch) of four containers 10. In this exemplary embodiment, there is a gap in the container flow after four containers. At the bottom edge of the figure, handling devices 4a and 4b are partly visible. At the handling devices 4a and 4b, the transfer area Xa and Xb can also be seen. The first container batch is moved straight over the transfer area Xa in FIG. 2. These containers are not taken over by the handling device 4a, but are transported further by the transport device 2. Instead, these containers are transferred (not shown) at a later point in time to one of the following handling devices. In the lower area of FIG. 2, a handling unit 40a can also be seen at the position of a treatment station 8a.

Figure 3:
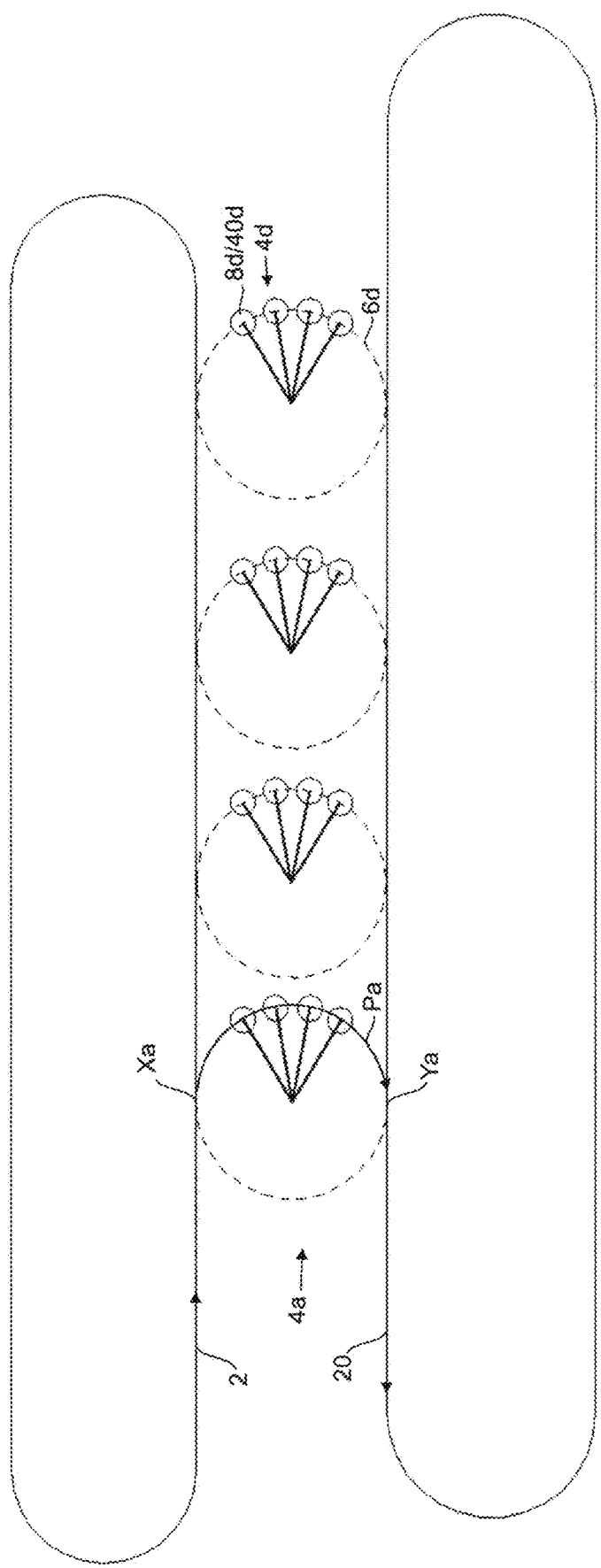
FIG. 3 shows a schematic representation of an alternative embodiment of an apparatus according to the invention.

FIG. 3 shows a schematic representation of an alternative apparatus according to the invention. In contrast to the device shown in FIG. 1 and FIG. 2, this alternative apparatus has 2 transport devices 2 or 20. The transport devices 2 or 20 are designed as transport oval and are arranged parallel to each other. The handling devices 4 are arranged between the transport devices 2 and 20. The untreated containers (not shown) are moved on the transport device 2 from left to right (anti-clockwise). As described in FIG. 1, the containers (also in this example in groups of four containers each) are transferred to the handling devices 4. Containers which are not taken over by a certain handling device 4a-c are transported past this handling device with the transport device 2. To ensure that all containers are treated, the cycle sequence must be selected in such a way that the containers are transferred to the last handling device (here 4d) at the latest. Thus, no containers should be transported past the handling device 4d via the curvature of the transport device 2 on the right-hand side and back to the left-hand side. (Exception: It would be conceivable to integrate a rejection for "bad containers" at this point. In this case, containers which do not meet the quality requirements would not be taken over by any handling device from the transport device 2, but would be transported further on the transport device 2 and rejected from the transport device 2 at a suitable location (e.g. in the upper part of the transfer system running from right to left).

In the example shown in FIG. 3, the handling devices 4 also rotate clockwise on the transport path P. For reasons of clarity, only the handling device 4a, the transport path Pa, the transfer area Xa and the delivery area Ya has been marked with a reference sign. Each handling device 4 again has a movable carrier 6, several handling units 40 and treatment stations 8. Also in FIG. 3, all handling devices are in a rest position, where the handling units 40 are placed at the (not shown in detail) treatment stations 8. For reasons of clarity, not all reference signs have been drawn in here either.

After treatment, the containers 10 are discharged at the discharge points Y to a further transport device 20. This transport device preferably also moves counter-clockwise. The containers discharged at the upper parallel area of transport device 20 are thus transported from right to left.

Figure 4:
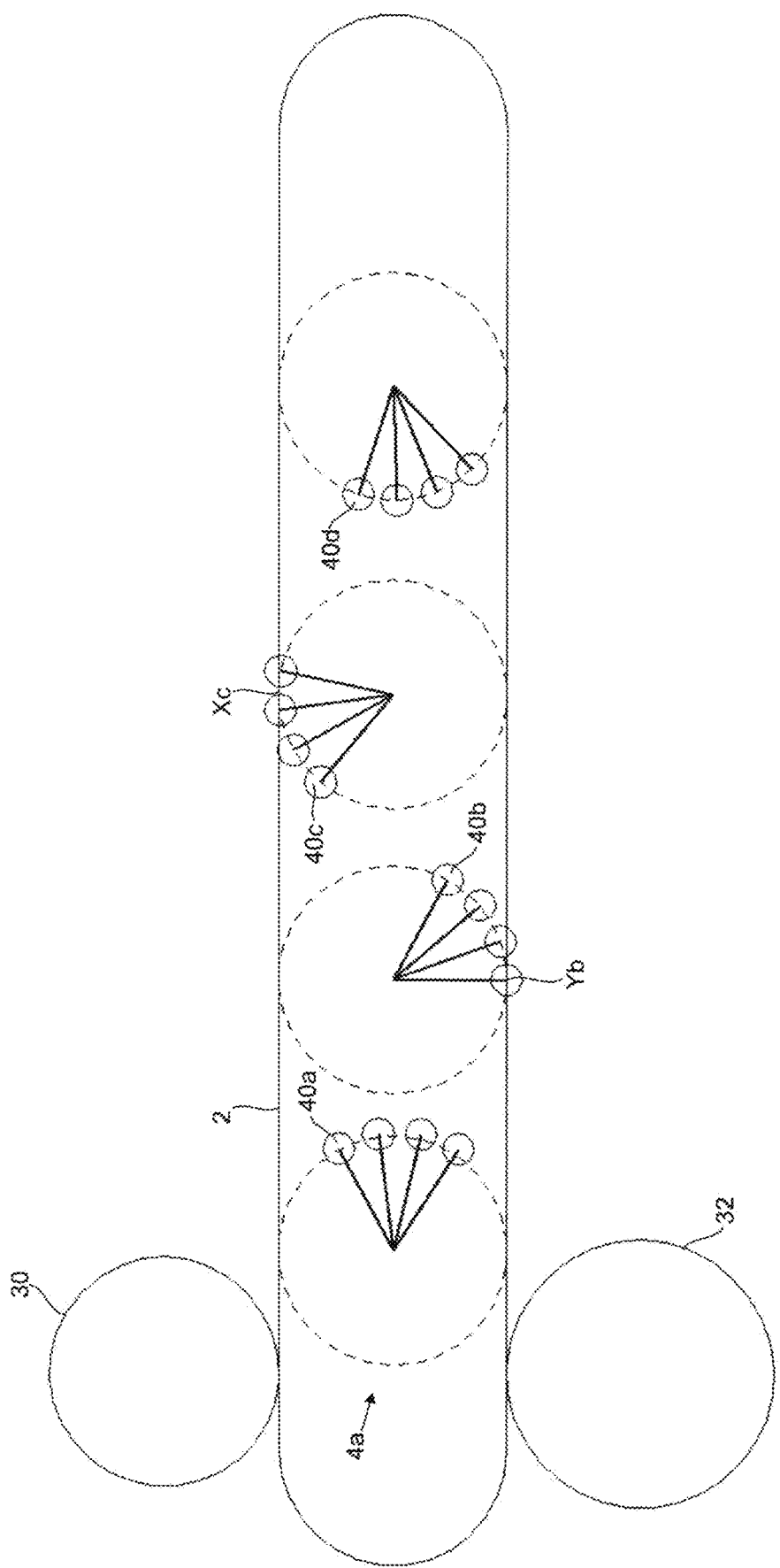
FIG. 4 shows a schematic representation of an embodiment of an apparatus according to the invention during the performance of the method according to the invention.

FIG. 4 shows an embodiment of an apparatus according to the invention during the execution of a method according to the invention. The apparatus substantially corresponds to the apparatus as already described in FIG. 1. In contrast to FIG. 1, however, it can be seen that not all handling devices 4 are in the rest position at the treatment stations 8.

On handling device 4a, the handling units 40a are located directly next to the treatment stations 8a. The containers 10 assigned to handling device 4a (transported by handling units 40a, but not shown separately) are treated by treatment stations 8 at the time shown in FIG. 4. It is advantageous that the speed of the handling device 4a is completely slowed down at this time.

At the handling device 4b, on the other hand, the first handling unit 40b is located at the discharge point Yb. The handling device 4b thus just transfers the already treated containers 10 to the transport device 2. It is advantageous that the speed of the handling device 4b is synchronised with the speed of the transport device 2 at this point in time. At the point in time shown in FIG. 4, the first handling unit 40b delivers a container to a free transport unit 22. The handling device 4b and the transport device 2 preferably move at such a speed that the next treated container can be delivered to the next free transport unit 22 in the second handling unit 40b.

The handling device 4d continues to rotate further clockwise at the time shown in FIG. 4. At this point in time, handling device 4d has already delivered all treated containers, so that the handling units 40d are empty and does not guide any containers. The speed of the handling device 4d can be selected relatively freely at this point. For example, it is possible that the speed is constant, the speed of handling device 4d and transport device 2 remain synchronised in this area. This simplifies the required control. However, it is also conceivable that the handling device 4d is accelerated in this area. This can be useful, for example, to save time. It is also conceivable that the speed is reduced in this area, for example to be able to maintain a desired cycle sequence.

On the handling device 4c, on the other hand, the handling units 40c are located in the transfer area Xc. The first handling unit 40c has already moved past the transfer area Xc and picked up an untreated container. The second handling unit 40c is located directly in front of the transfer area Xc and is about to pick up an untreated container. The speeds of the transport device 2 and the handling unit 4c are preferably synchronised at this point at time. The container in the next transport unit 22 is preferably transferred to the next handling unit 40c in each case.

Figure 5:
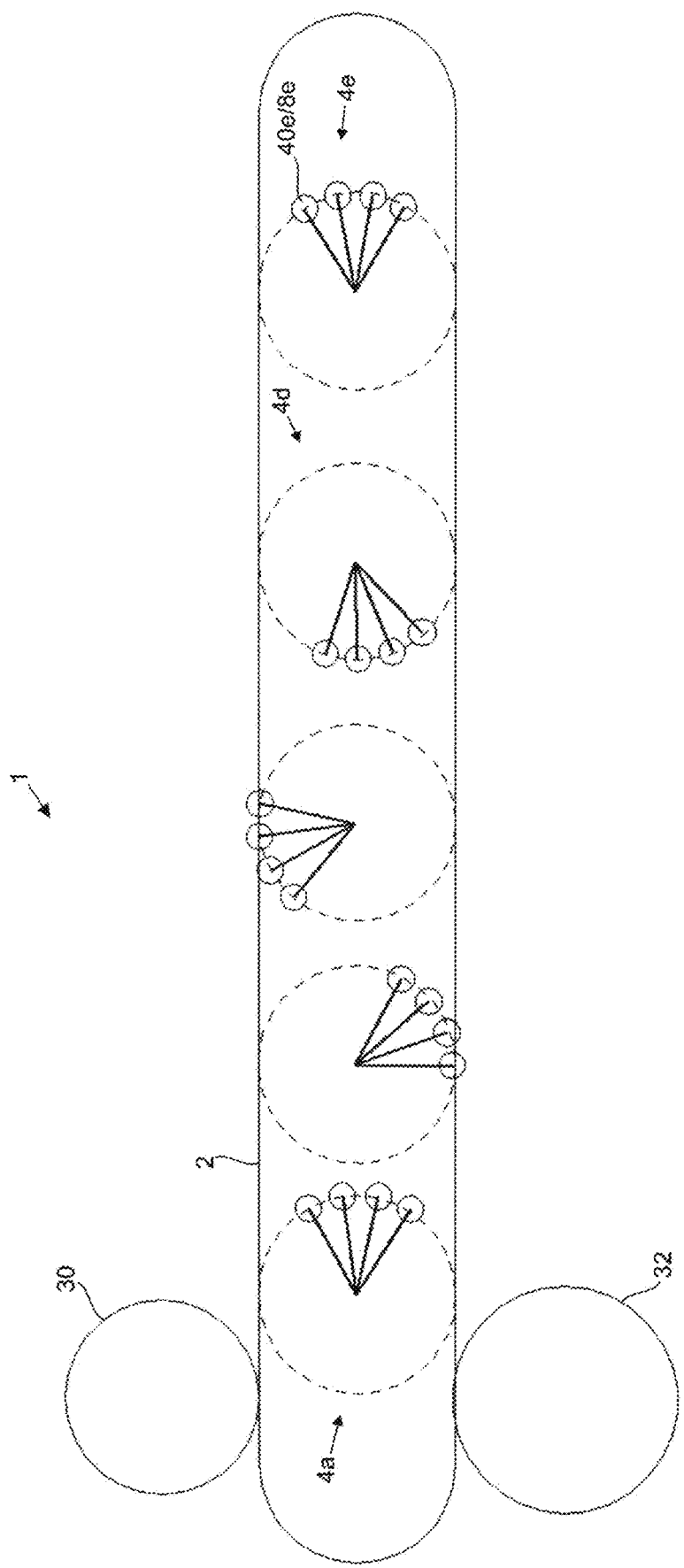
FIG. 5 shows a schematic representation of an embodiment of an apparatus according to the invention with reserve station.

FIG. 5 shows an embodiment of an apparatus according to the invention with a reserve station. The figure substantially corresponds to the illustration in FIG. 4. In FIG. 5 the handling devices 4a-4d are also in similar positions to FIG. 4. In addition, however, the apparatus 1 in FIG. 5 also has a reserve station. This reserve station consists in particular of a handling device 4e with handling units 40e. In addition, treatment stations 8e are assigned to the handling device 4e, which are located in a fixed position below the handling units 40e and are not shown separately in FIG. 5. In this embodiment, containers are only transferred to the handling device 4e if one of the handling devices 4a-d cannot be used, for example, because of a defect or a maintenance is required.

Figure 6:
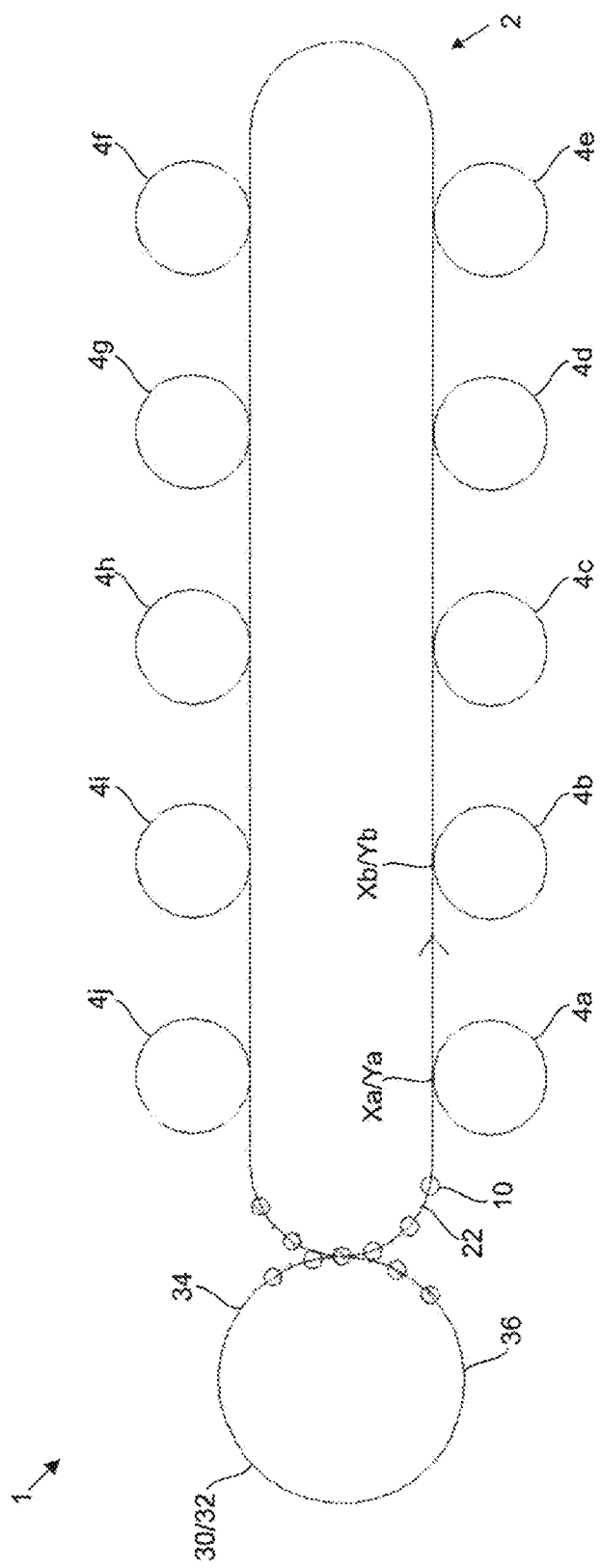
FIG. 6 shows a schematic representation of an alternative embodiment of an apparatus according to the invention, in which the transfer and discharge area are spatially identical.

FIG. 6 shows an embodiment where the transfer and discharge areas are spatially identical. In this case, the apparatus 1 has an infeed starwheel 30, which can simultaneously take over the role of an outlet starwheel 32. In this example the starwheel rotates clockwise. Untreated containers 10 are fed via the infeed 34 (upper area of the starwheel) to the transport device 2. On the infeed and outlet starwheel as well as on the transport device 2, only every second transport unit 22 is occupied. Empty transport units 22 are symbolically marked with a small line in the transfer area, while occupied transport units are marked with a circle. This occupation pattern continues, wherein the marking is not continued for reasons of clarity.

The containers 10 are transported counterclockwise by the transport device 2. At the transfer areas X, containers can be transferred to handling devices 4. In this case, the handling devices 4 are arranged around the outside of the transport device 2. Containers which are not picked up by handling device 4a are transported further by the transport device 2, etc. Containers which have been transferred to a handling device 4 are transported by the handling device 4 to stationary handling stations 8 (not shown). After the containers have been handled, they are transported further by the handling device 4 to the discharge area Y (corresponding to the transfer area X). In discharge area Y, the (now treated) containers 10 are again transferred to the transport device 2. The treated containers 10 (hatched pattern) leave the transport device 2 and are transferred to the outlet starwheel 30/32 (outlet 36).

Figure 7:
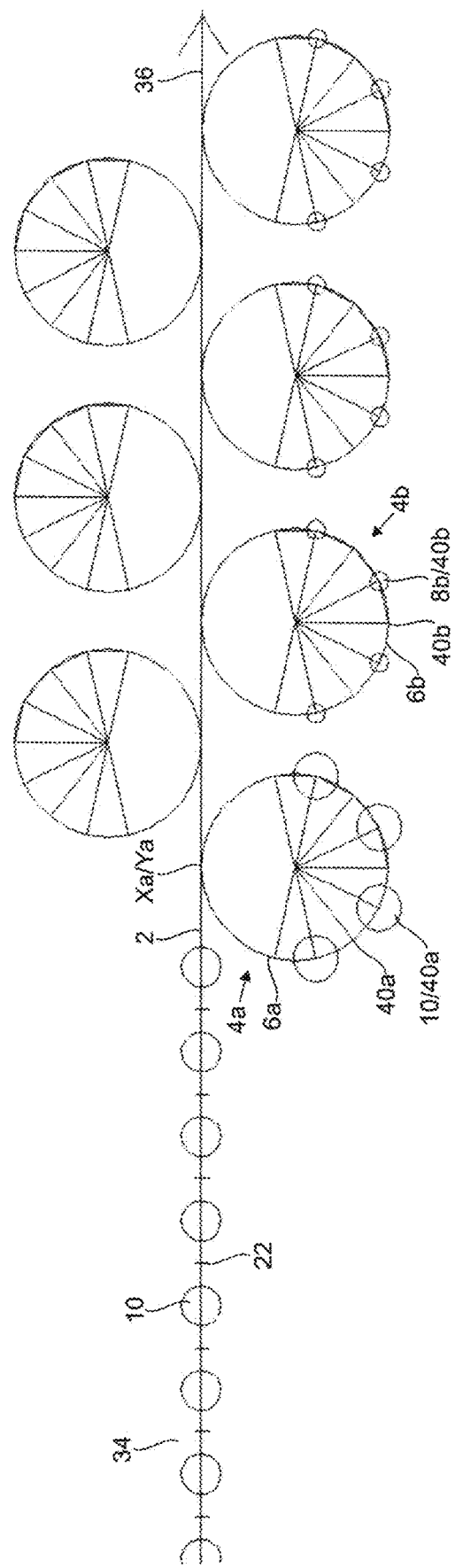
FIG. 7 shows a schematic representation of an embodiment of an apparatus according to the invention with a linear transport device.

FIG. 7 shows an alternative arrangement. Here, the transport device 2 is not oval but linear. On the left side of the figure there is the inlet 34, on the right side the outlet 36. Here, too, only every second transport unit 22 is equipped with a container 10. The handling devices 4 are arranged lateral at the linear transport device 2.

As an example, it is shown that the handling device 4a has a rotatable carrier 6a and the transfer area Xa corresponds to the discharge area Ya. The handling device 4a has several handling units 40a (radial lines). Every second handling unit 40a is equipped with a container 10 (large circle). The other handling units 40a are empty in FIG. 7. The handling device 4b, which is also shown as an example, also has several handling units 40b. Here, all handling units 40b are shown empty. However, the treatment stations 8b (marked by a small circle) can be recognised (for example arranged below). Here it can be seen that the stationary stations are only located below every second handling unit 40b. The position of the containers 10 located in the handling device 4a corresponds to the position of the treatment stations. This means that after picking up containers 4, the handling devices 4 rotate exactly so far that the containers 10 can be picked up by the assigned treatment stations.

Figure 8:
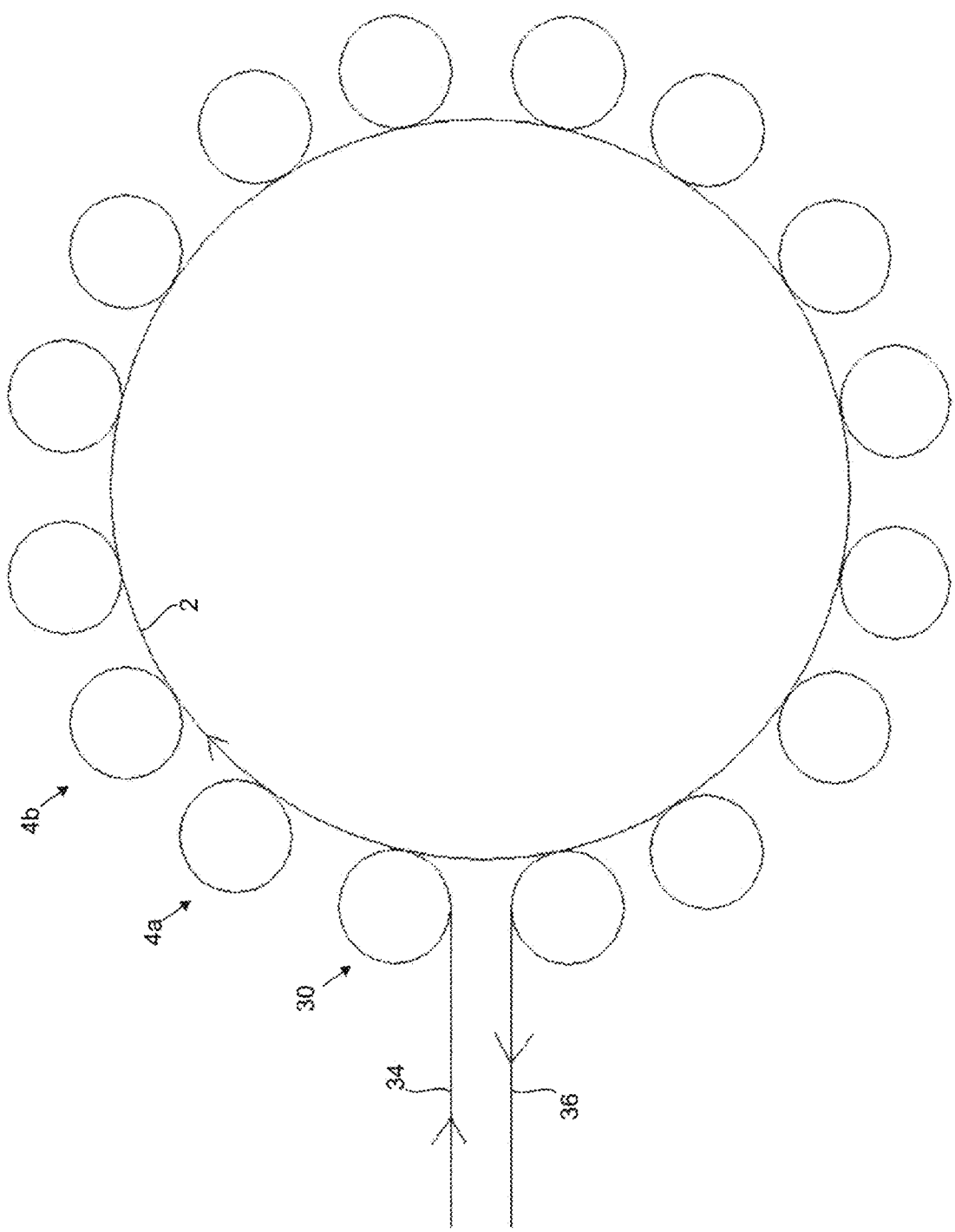
FIG. 8 shows a schematic representation of an embodiment of an apparatus according to the invention with a transport carousel.

In FIG. 8 the transport device 2 is designed as a transport carousel. The handling devices 4 are arranged like satellites around the transport device 2. The containers are fed to the transport device via an infeed 34 and an infeed starwheel 30 and discharged via an outlet starwheel 32 and an outlet 36. In this example, the transport device rotates clockwise.

Figure 9:
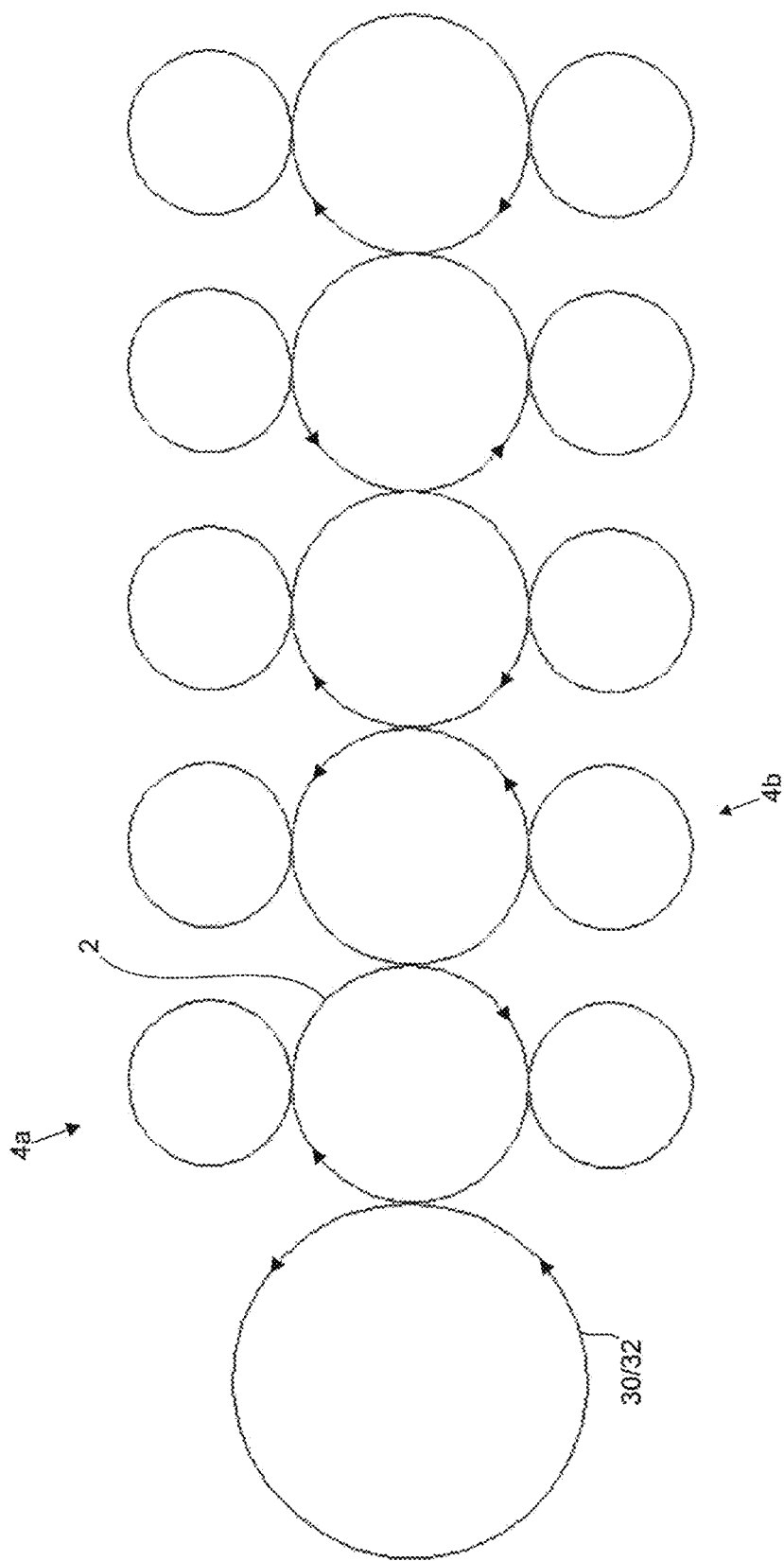
FIG. 9 shows a schematic representation of an embodiment of an apparatus according to the invention with star-shaped columns.

FIG. 9 shows an alternative embodiment. Here, the transport device 2 is designed in the form of star-shaped columns. The containers can again be fed to the transport device 2 via an infeed and discharge starwheel 30/32. The containers are taken over by a first transfer starwheel which rotates clockwise, passed further to a second transfer starwheel which rotates counter-clockwise, etc. In this way, the containers cover a meandering path. The handling devices 4 are arranged laterally to the row of transfer starwheels.

Figure 10A:
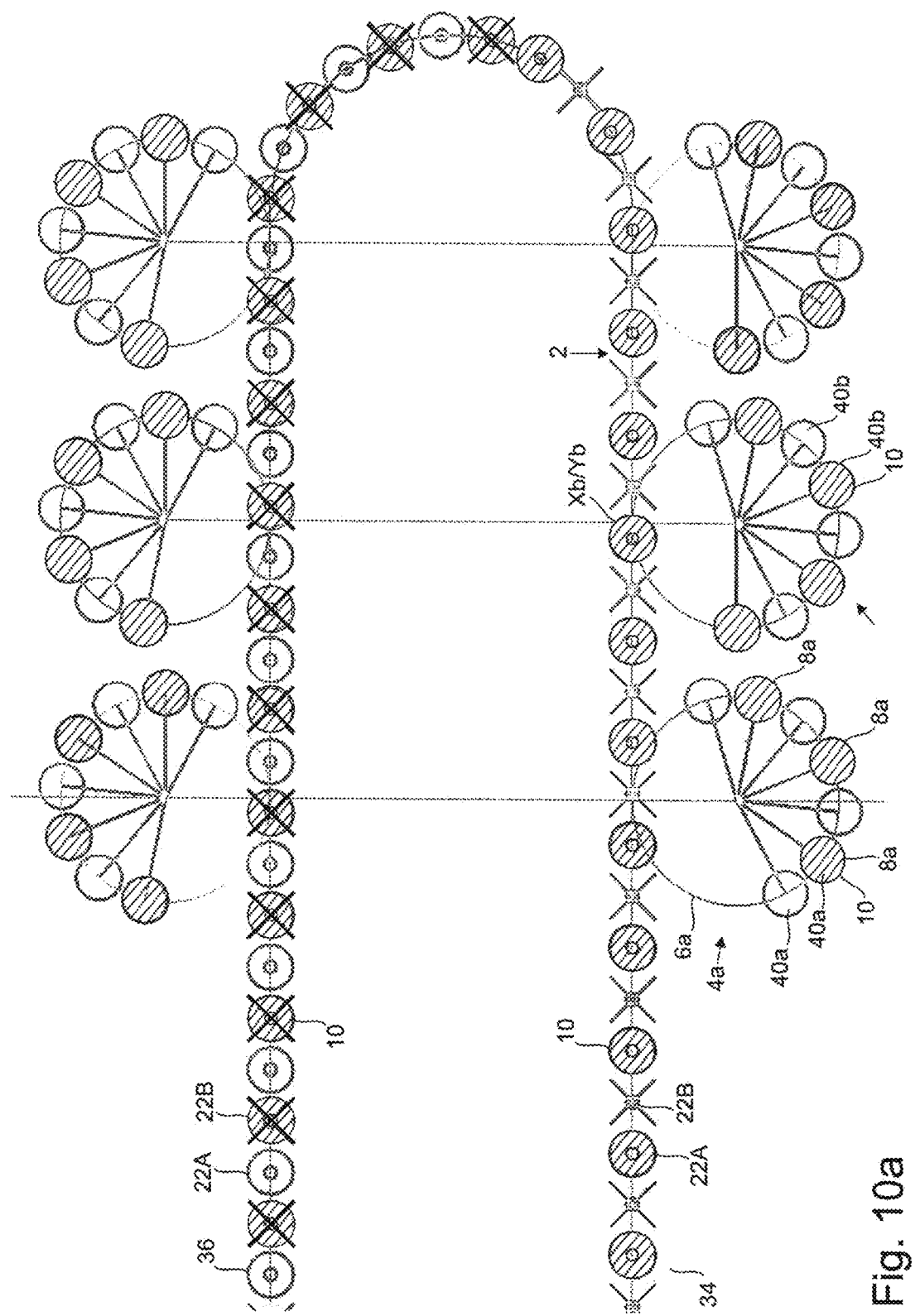
FIG. 10a shows a schematic representation of an embodiment of an apparatus according to the invention, in which every second transport unit is occupied.
Figure 10B:
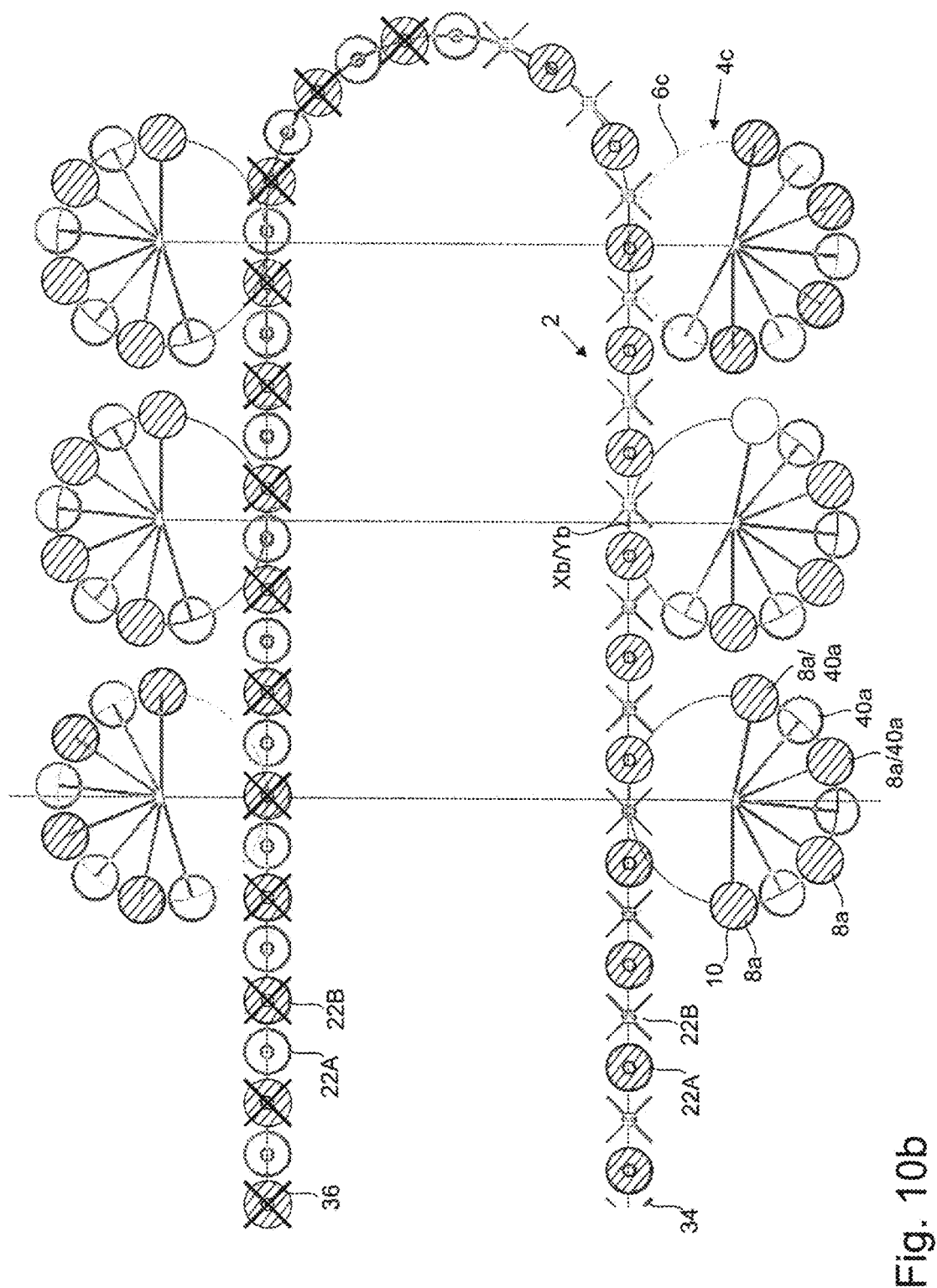
FIG. 10b shows a schematic representation of an embodiment of an apparatus according to the invention, in which every second transport unit is occupied during a second cycle.

FIG. 10a and FIG. 10b show the same embodiment of an apparatus according to the invention at two different times. In both figures it can be seen that the transport device 2 has a plurality of transport units 22. For differentiation, the transport units are alternately marked with a circle (22A) or a cross (22B). Hatched circles mark a container 10.

Several handling devices 4 are arranged around the transport device 2. As an example, it is shown that the handling device 4*a* has a carrier 6*a* and several handling units 40*a* (circles on radial lines). These handling units 40*a* are alternately occupied by a container 10 (hatched circle) or unoccupied (unfilled circle). Below the handling units 40*a* occupied by a container 10 are the treatment stations 8*a* (not shown separately).

The handling device 4*b* is also shown as an example that it consists of several handling units 40*b*, every second of which is equipped with a container 10. The transfer area Xb and the discharge area Yb correspond.

During a method according to the invention, the handling device 4*b*, for example, turns clockwise from this position. At the discharge point Yb, it first discharges a treated container 10 from the first handling unit 40*b* to a vacant transport unit. After both the handling device 4*b* and the transport device 2 have moved further synchronously, the transport device 2 transfers an untreated container 10 from the next occupied transport unit 22 to the second (vacant) handling unit 40*b*. The transport device 2 and the handling device 4*b* continue to rotate synchronised. The handling device 4*b* transfers the next treated container from the third handling unit 40*b* to the next, unoccupied transport unit 22, etc. As can be seen, the transport units 22A (marked with a circle) are therefore occupied with a container at the infeed 34, while transport units 22B (marked with a cross) are occupied with a container at the outlet 36. It can thus be recognised that the treated containers are transported by transport units 22B, while the untreated containers are transported by transport units 22A.

After all handling units 40*b* have discharged the treated containers or have picked up new, untreated containers, the handling device 4*b* continues to rotate to the position where the handling units 40*b* loaded with containers are positioned above the treatment stations 8*b*, so that the containers 10 can be treated in them. As a comparison of FIGS. 10*a* and 10*b* shows, the handling devices 4 therefore assume two different rest positions. In FIG. 10*b*, for example, handling device 4*b* is rotated one position further: In FIG. 10*a* the last handling device 40*b* is occupied by a container and is in the "9 o'clock position" directly above a treatment station 8*b*. In FIG. 10*b*, however, the last handling unit 40*b* is unoccupied and the penultimate handling unit 40*b* is occupied. So that the container is also located directly above the treatment station 8*b*, the handling device 4*b* must be turned further accordingly.

In addition, a special feature can be seen: One of the handling devices (in this case handling device 4*a*) has one handling unit 40*a* less than the other handling devices 4*b*-4*f*. This is necessary so that a continuous container flow with alternating full-empty loads is also produced at the outlet of the transport device 2. During each cycle, the treated containers are placed by the handling devices alternately before and after the untreated containers in the transport device 2. To compensate for this change, the one handling device 4*a* with a reduced number of handling units 40*a* is required.

Figure 11:
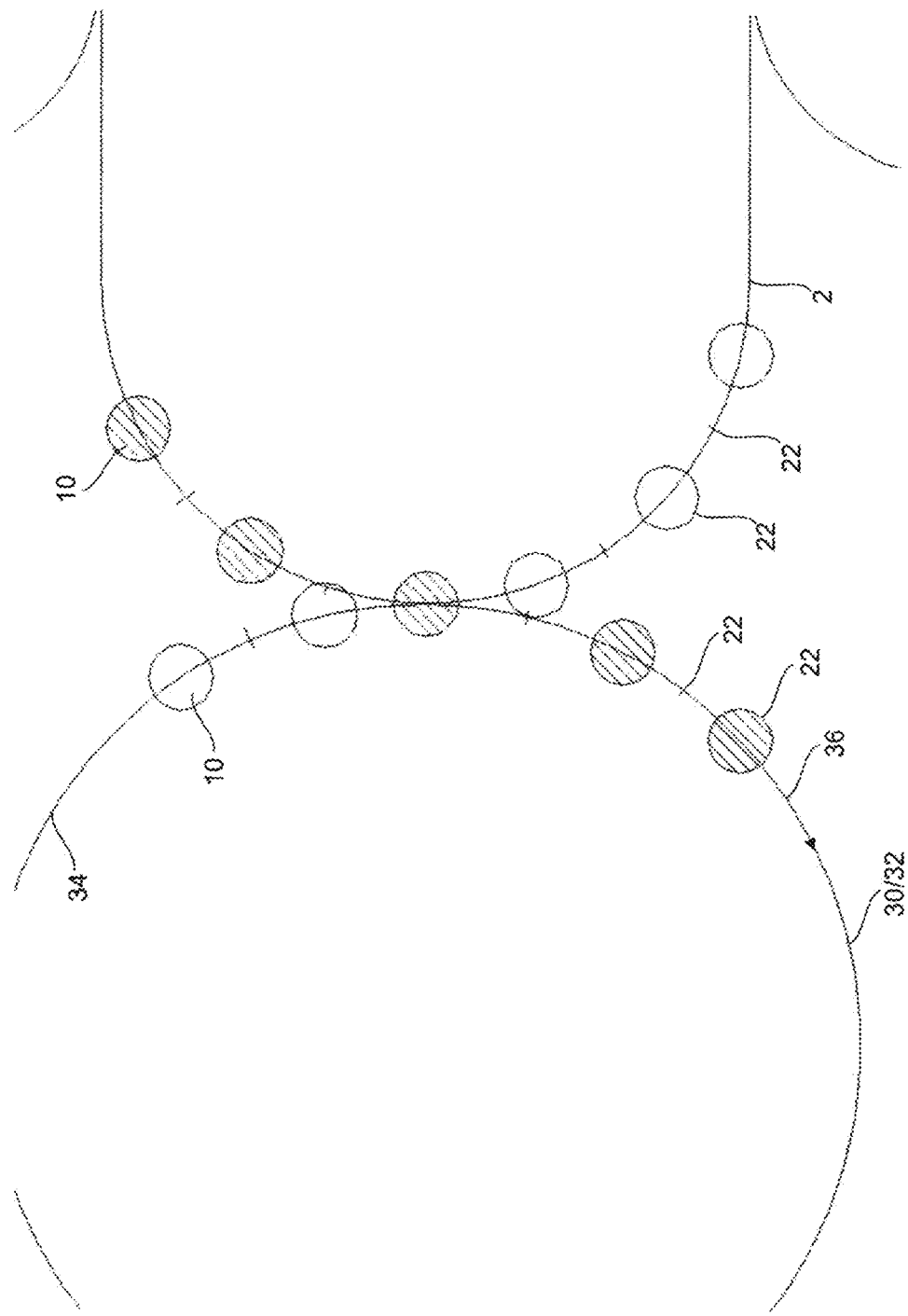
FIG. 11 shows an enlarged representation of the transfer area from an infeed starwheel to a transport device.

FIG. 11 shows in enlarged view the infeed from the infeed starwheel 30 to the transport device 2 or the outlet from the transport device. On both sides of the transfer point only every second transport unit 22 is equipped with a container 10. The unloaded transport units 22 are marked with a line. The untreated containers 10 are shown with an unfilled circle, the treated containers with a circle with hatched filling. At the transfer point, a treated container 10 is just located which is transferred by the transport device 2 to the infeed and discharge starwheel 30/32. If the infeed and discharge starwheel 30/32 and the transport device 2 continue to rotate, an unoccupied transport unit 22 of the transport device 2 and an untreated container (currently both above the transfer point) meet up next. The infeed or discharge starwheel 30/32 can thus transfer an untreated container to a vacant transport unit 22. If the rotation continues, a treated container 10 of the transport device 2 and a vacant transport unit 22 of the infeed and discharge starwheel 30/32 meet each other next. The transport device 2 can thus discharge the treated container to the infeed and discharge starwheel 30/32.

Figure 12:
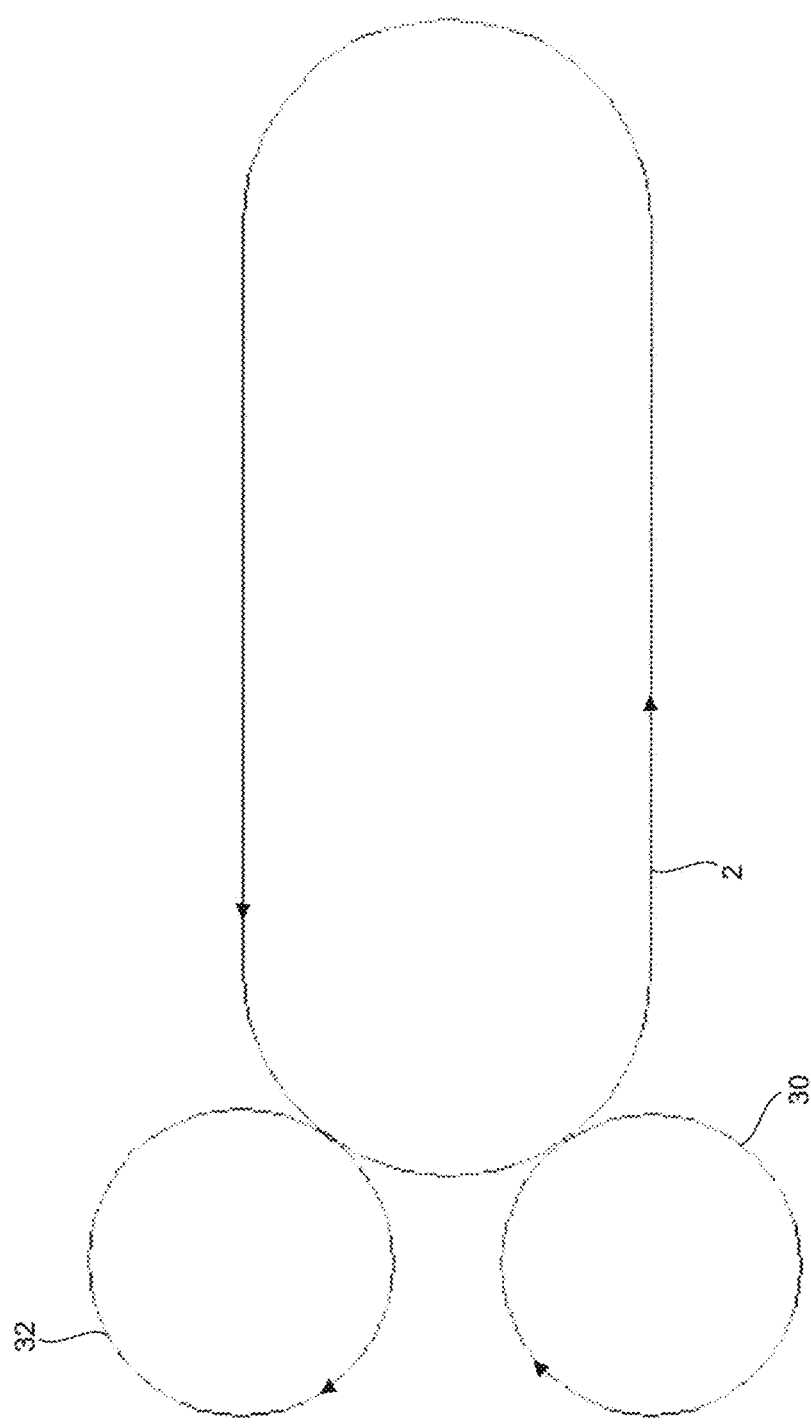
FIG. 12 shows a schematic representation of an embodiment of an apparatus according to the invention with a separate infeed and outfeed starwheel.

FIG. 12 shows an alternative embodiment in which the inlet starwheel 30 and the outlet starwheel 32 are designed as separate stars.

Figure 13A:
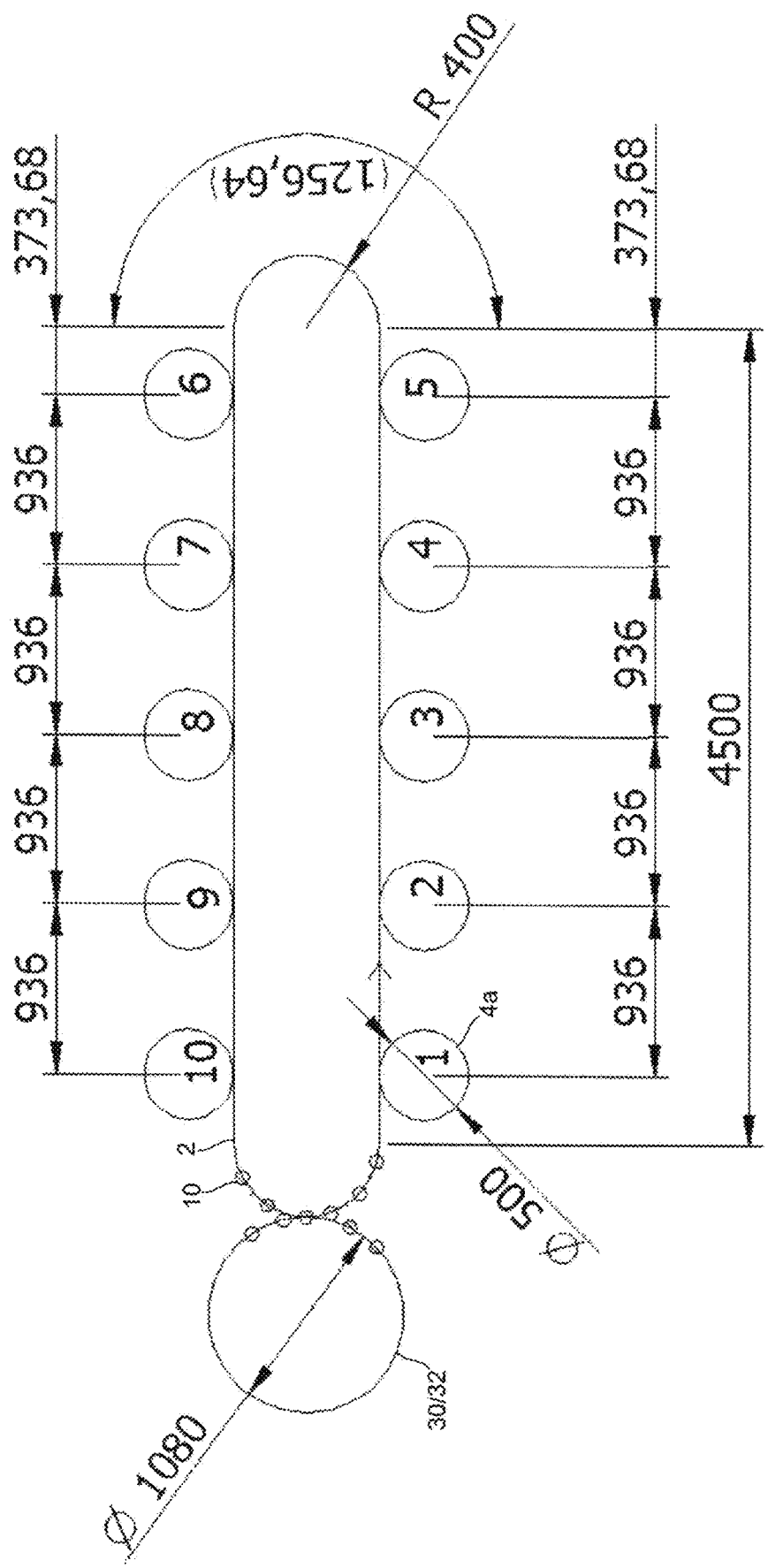
FIG. 13a shows a representation of an embodiment of an apparatus according to the invention with exemplary size specifications.

FIG. 13*a* shows a preferred embodiment with exemplary dimensional data, which are particularly advantageous for a container coating machine. The dimensions 936 mm (distance between the transfer/discharge points X/Y), 373.68 mm (distance between the last transfer/discharge point and the beginning of the curvature of the transfer oval) and R400 mm (radius of the curvature of the transfer oval), i.e. the distances of the handling stations along the transport device 2 are particularly important. With this arrangement and a path speed of the transport device of 0.8 m/s (division of the transport units along the transport device: 120 mm), a cycle distance of 1.185 s results. With 10 stations, this results in a cycle time of 10×1.185 s=11.85 s.

In an exemplary coating process, it takes about 2 seconds to evacuate the vacuum chamber. However, since the next handling device switches after 1.185 s, two vacuum pumps are used for the evacuation. Each pump therefore only evacuates for about 1 second. This is less than the 1.185 s available from the cycle time, so as desired, there is no temporal overlapping of the evacuation processes.

A favourable switching sequence of the 10 handling devices is shown in FIG. 13*b*. Here the abbreviation "S1" refers to handling device 4*a*, "S2" to handling device 4*b*, etc.

Figure 14A:
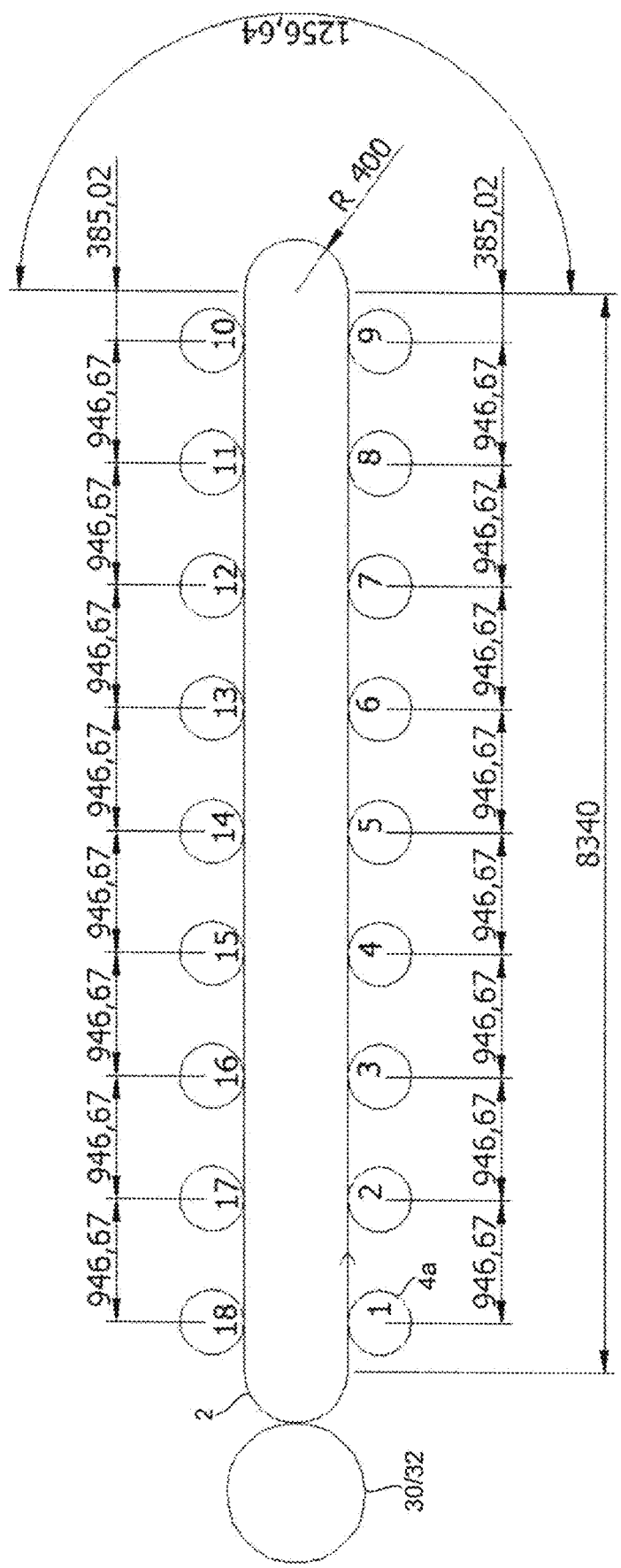
FIG. 14a shows a further representation of an embodiment of an apparatus according to the invention with exemplary size specifications.

Another preferred size is shown in FIG. 14*a* and the corresponding switching sequence in FIG. 14*b*. A special feature here is the double vacuum supply. This is necessary because the geometric conditions do not allow simultaneous switching of two handling devices. For this reason, the stations 10-18 cycle about 0.6 s offset to stations 1-9.

Figure 15A:
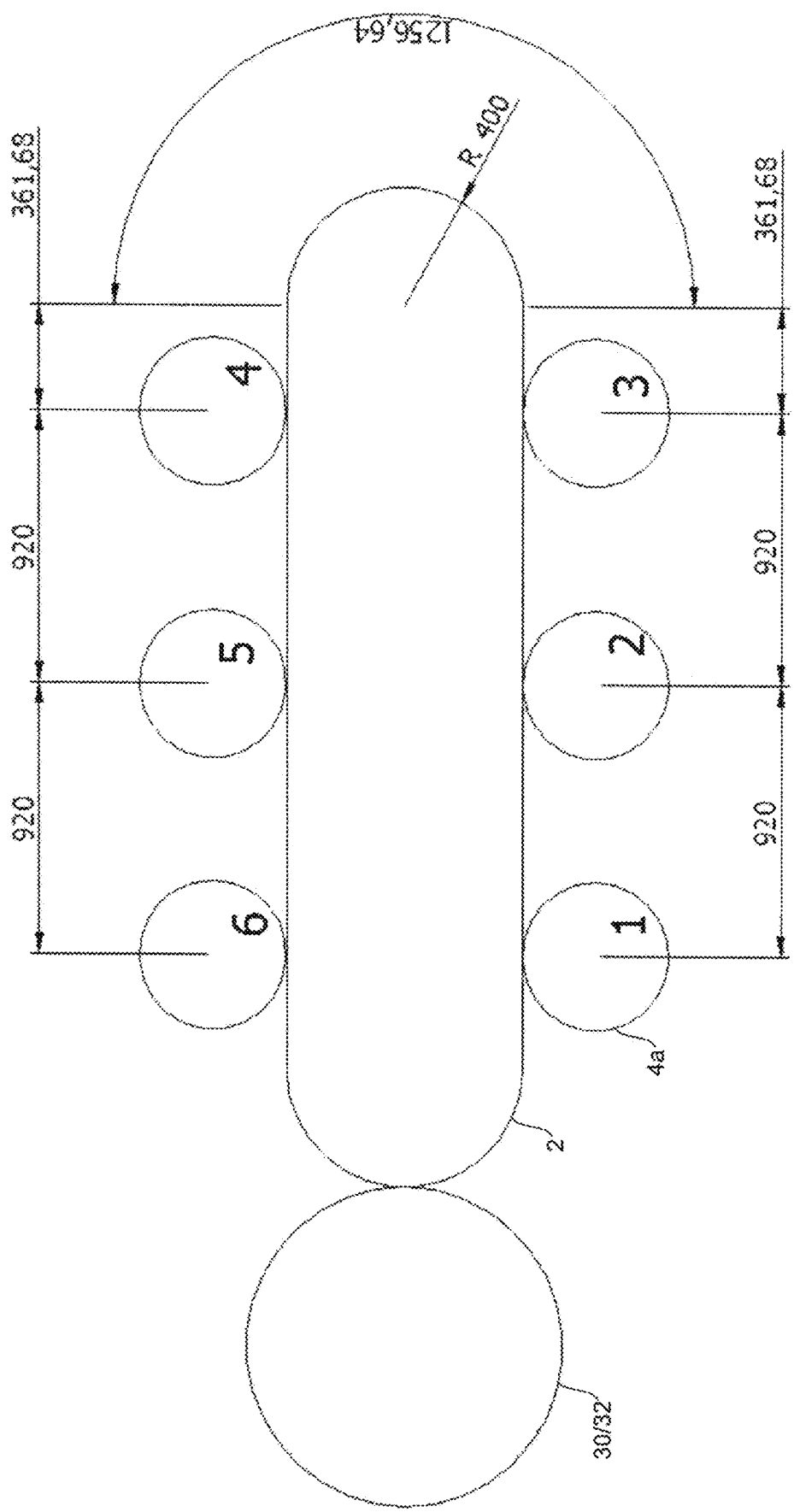
FIG. 15a shows a further representation of an embodiment of an apparatus according to the invention with exemplary size specifications.

Another preferred size is shown in FIG. 15*a* and the corresponding switching sequence in FIG. 15*b*.

Figure 16:
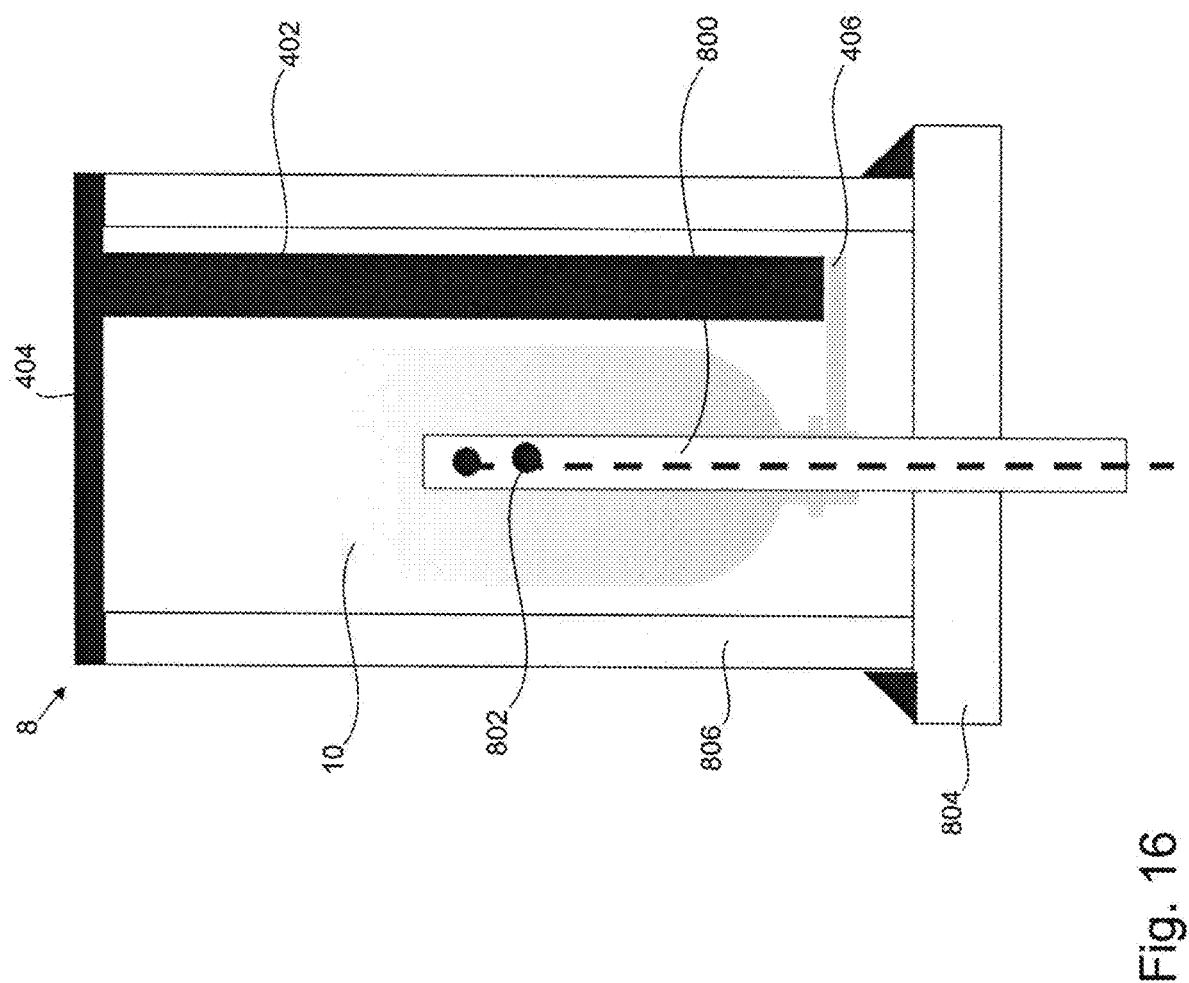
FIG. 16 shows a representation of a treatment chamber for coating containers.

FIG. 16 shows a representation of a treatment station 8. A container 10 is inserted into treatment station 8. It is held by a support element 402 with the aid of a gripper 406. The carrier element 402 can be moved vertically upwards so that the container 10 held by the gripper 406 is also moved vertically upwards and out of treatment station 8.

The treatment station 8 comprises a stationary base part 804 and stationary walls 806. A locking element 404 is arranged on the support element 402. This is movable together with the support element 402. When the support element 402 is moved upwards, the locking element 404 is lifted from the walls 806 of the treatment station 8. If, however, the support element 402 is in its lowest position—as shown—the locking element 404 together with the walls 806 seals the treatment station 8 airtight.

Treatment station 8 also contains a treatment unit 800, which is also advantageously arranged stationary so that the container 10 is pushed over the treatment unit 800 when it is inserted into the treatment station 8. The treatment unit 800 has several openings 802 through which plasma can be advantageously introduced into the interior of container 10.

Figure 17:
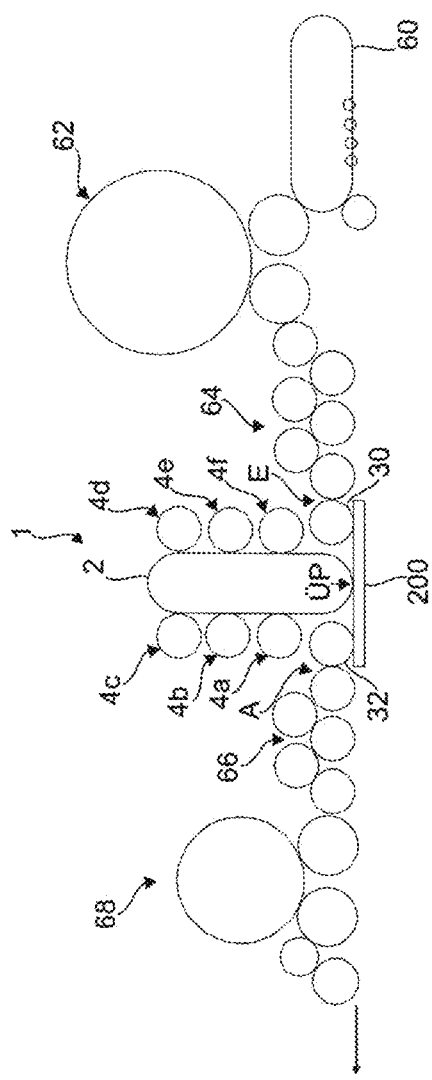
FIG. 17 shows a schematic representation of a system with bypass.

FIG. 17 shows a schematic representation of a system with an apparatus 1 according to the invention with bypass. This figure thus shows by way of example how the apparatus 1 according to the invention can be integrated into a complete plant. It can be seen that the containers 10 first pass as preforms (not shown) through a heating device 60, then through a forming device 62 and are formed into bottles, for example. By means of a transfer unit 64, the containers can be transported from the forming unit 62 to the infeed E of the apparatus 1 for coating containers. At infeed E, the containers are taken over by an infeed starwheel 30. The infeed starwheel 30 can be a distribution delay starwheel or a normal transfer starwheel. The containers 10 are transferred from the infeed starwheel 30 to the second transport device 200.

In bypass mode, the containers are transported further on the transport device 200 up to an outlet starwheel 32. The outlet starwheel 32 can be a distribution delay starwheel or a normal transfer starwheel. From the outlet starwheel 32, the containers are transferred at outlet A to a further transfer device 66, which transports them to a downstream filler.

In a coating mode, the containers are transferred at the transfer point ÜP from the second transport device 200 to a first transport device 2. Along the first transport device, six handling devices 4a, 4b, 4c, 4d, 4e, 4f are shown in the figure. Each of these handling devices can take containers from the first transport device 2 and feed them to treatment stations in which the containers are coated.

Figure 18:
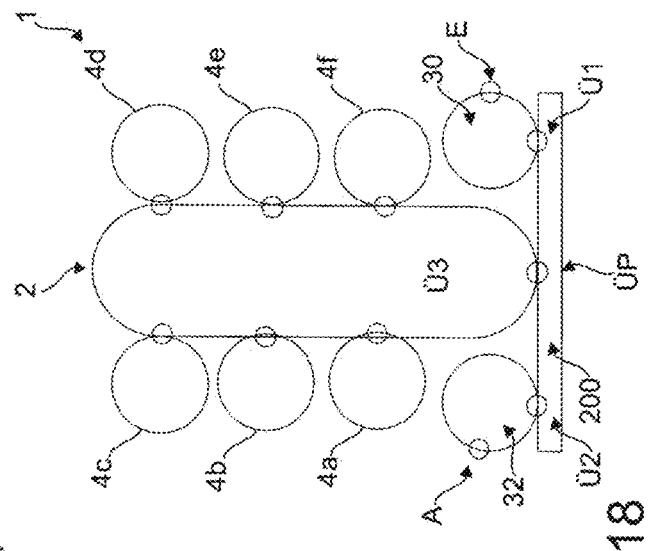
FIG. 18 shows a schematic representation of an apparatus according to the invention with bypass.

FIG. 18 shows a schematic representation of an apparatus 1 according to the invention with bypass. In this figure, transfer points at which containers can be transferred from one device to the next are each marked with a dot. The first transfer point is the infeed E at the infeed starwheel 30. The second transport device 200 can also be seen, wherein the containers are transferred from the infeed starwheel 30 at a further transfer point Ü1 to the second transport device 200. Ü2 marks the transfer point at which the containers are transferred from the second transport device 200 to the outlet starwheel 32. A marks the outlet. The transfer point between the second and first transport device is marked with ÜP. Further possible transfer points Ü3 are between the first transport device 2 and the different handling devices 4a-4f.

Figure 19:
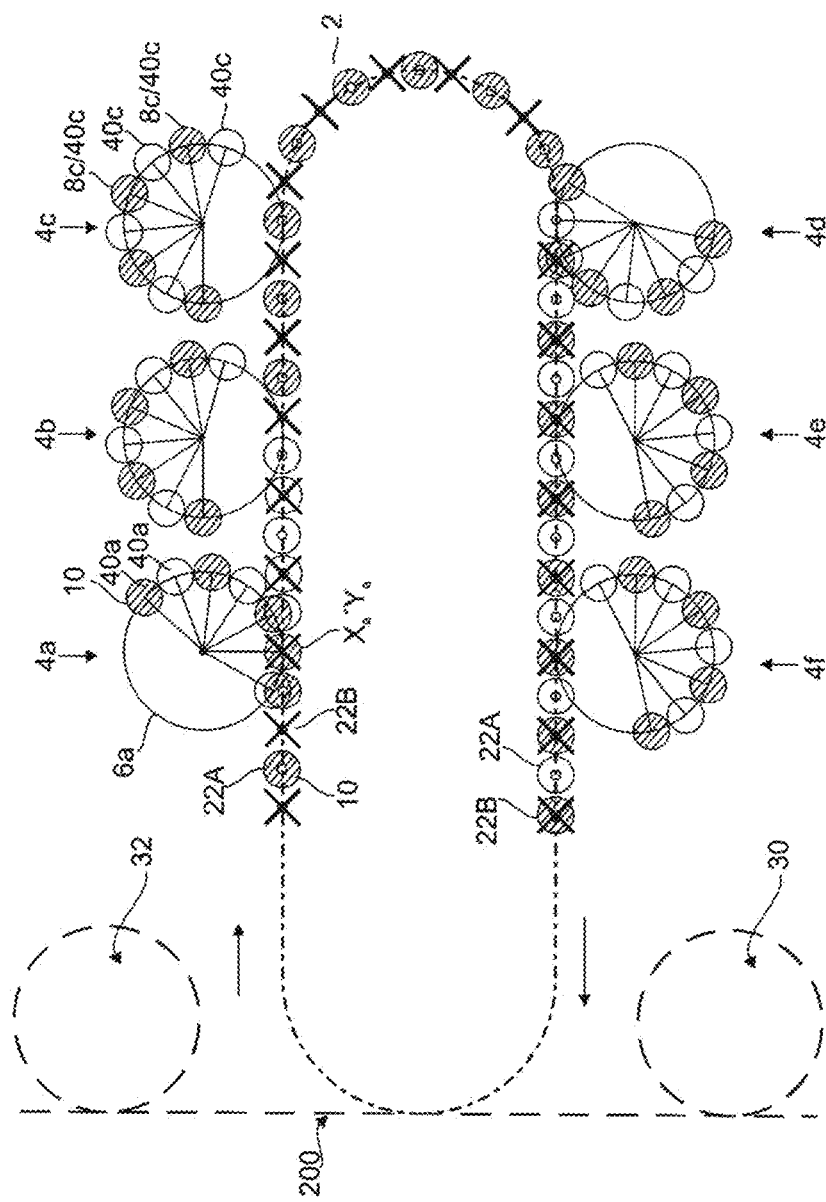
FIG. 19 shows a further schematic representation of an apparatus according to the invention with bypass.

FIG. 19 shows a representation of the apparatus according to the invention, in which the handling devices 4a-4f are more clearly shown. It can be seen that the first transport device 2 has a plurality of transport units 22. For differentiation, the transport units are alternately marked with a circle (22A) or a cross (22B). Hatched circles mark a container 10.

Several handling devices 4 are arranged around the transport device 2. For the handling device 4a it is shown as an example that the transfer area Xa and the discharge area Ya correspond to each other. It is shown as an example that the handling device 4a has a carrier 6a and several handling units 40a (circles on radial lines). These handling units 40a are alternately occupied with a container 10 (hatched circle) or unoccupied (unfilled circle). This is also shown again on the handling device 4c for better illustration. Here, the handling device 40c is in such a position that the treatment stations 8c (not shown separately) are located below the handling devices 40c occupied by a container 10.

During a method in which containers are to be coated, the handling device 4a, for example, rotates clockwise from this position. At the discharge point Ya, it first discharges a treated container 10 from the first handling unit 40a to a vacant transport unit. After both the handling device 4a and the transport device 2 have moved on synchronously, the transport device 2 transfers an untreated container 10 from the next occupied transport unit 22 to the second (vacant) handling unit 40a. The transport device 2 and the handling device 4a continue to rotate synchronised. The handling device 4a transfers the next treated container from the third handling unit 40a to the next, unoccupied transport unit 22, etc. As can be seen, therefore, at the beginning of the transport device 2, the transport units 22A (marked with a circle) are occupied with a container, while at the end of the transport device, transport units 22B (marked with a cross) are occupied with a container. It can thus be seen that the treated containers are transported by transport units 22B, while the untreated containers are transported by transport units 22A.

After all handling units 40a have discharged the treated containers and picked up new untreated containers, handling device 4a continues to rotate to the position where the handling units 40a loaded with containers are positioned above the treatment stations so that the containers 10 can be treated in them. The handling device 40c, for example, is in a corresponding position.

Also shown in FIG. 19 are the second transport device 200 and the infeed starwheel 30 and outlet starwheel 32. The transport device 200 can be a chain, for example. In this case the infeed starwheel 30 and the outlet starwheel 32 would be distribution delay starwheels. If the transport device 200 has a long stator linear motor, the infeed starwheel 30 and the outlet starwheel 32 can be designed as normal transfer stars.

Figure 20:
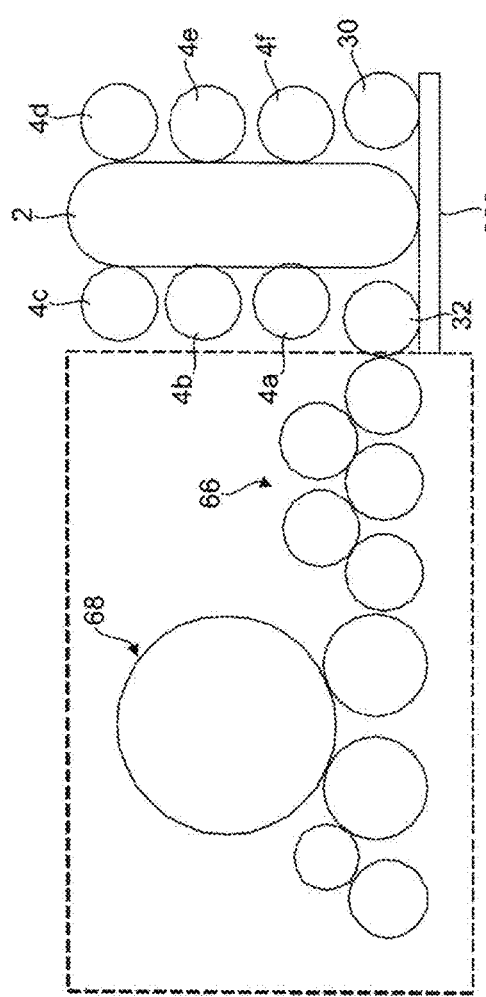
FIG. 20 shows a schematic representation of an apparatus according to the invention with further treatment devices arranged downstream.

FIG. 20 shows the already described apparatus for coating containers with downstream devices in the form of a transfer device 66 and a filler 68. How these devices 66 and 68 are operated in a bypass mode depends on the design of the second transport device. If it has a long stator linear motor, the containers in the transport device 200 can only be transported by transport units 22A and the devices 66 and 68 can still be operated in the same way as in a coating mode. In this case, the speed of the transport units only has to be adjusted with the aid of the long-stator linear motor so that the moment a transport unit 22B would be at the transfer point Ü2 in a coating mode, a transport unit 22A would now be.

If, on the other hand, the second transport device 200 is a chain where the distance between the transport units cannot be varied, transfer unit 66 and filler 68 (in the dotted area) must be offset via an electronic gear.

Figure 21:
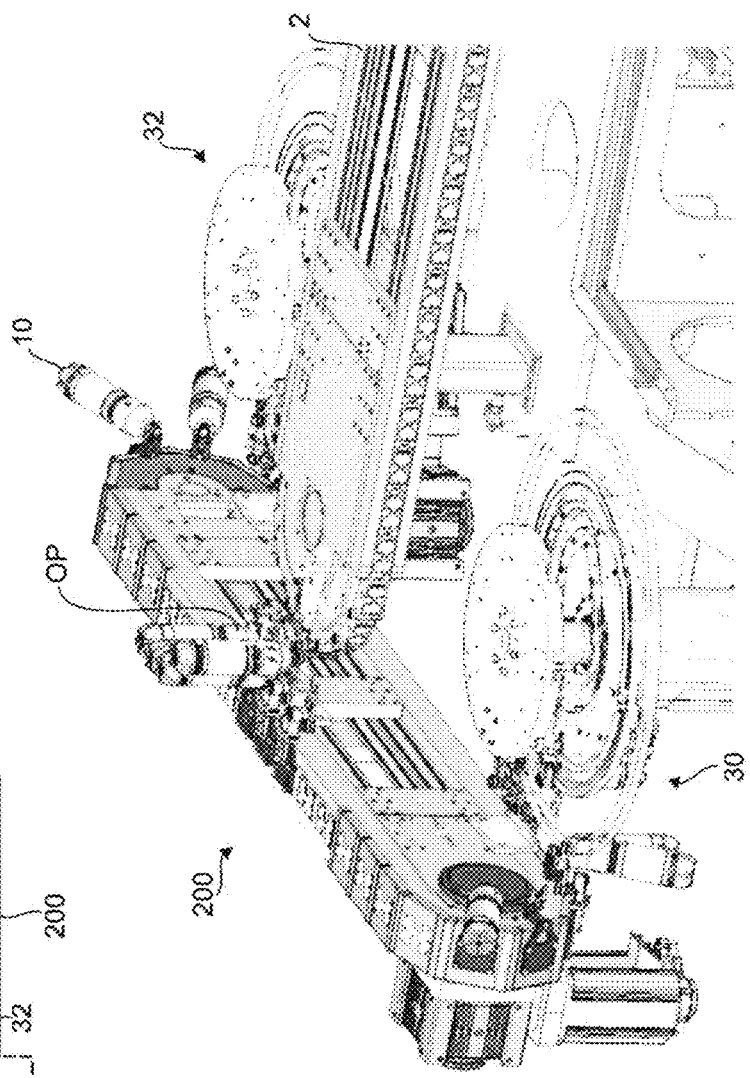
FIG. 21 shows a representation of a second transport device, which is also a turning device.

FIG. 21 shows a representation of a second transport device, which is also a turning device. An infeed starwheel 30, designed as a distribution delay starwheel, can be seen, which transfers containers 10 in an upright position to the second transport device 200. The containers are moved upwards over a curved section by the transport device 200. This movement automatically turns the containers 10 so that they are transported in the upper area of the second transport device 200 in an inverted position. At transfer point ÜP, the containers 10 are transferred from the second transport device 200 to the first transport device 2. After the containers 10 have circled the first transport device 2, the containers 10 are transferred again to the second transport device 200 at transfer point ÜP. The containers are still in an inverted position, as this position is preferred for coating. After the containers have been transported along a linear section of the transport device 200, they are transported downwards a curved section, whereby the containers 10 are automatically turned back into an upright position. In this upright position, the containers 10 are transferred to the outlet starwheel 32, which is designed as a distribution delay starwheel.

Figure 23:
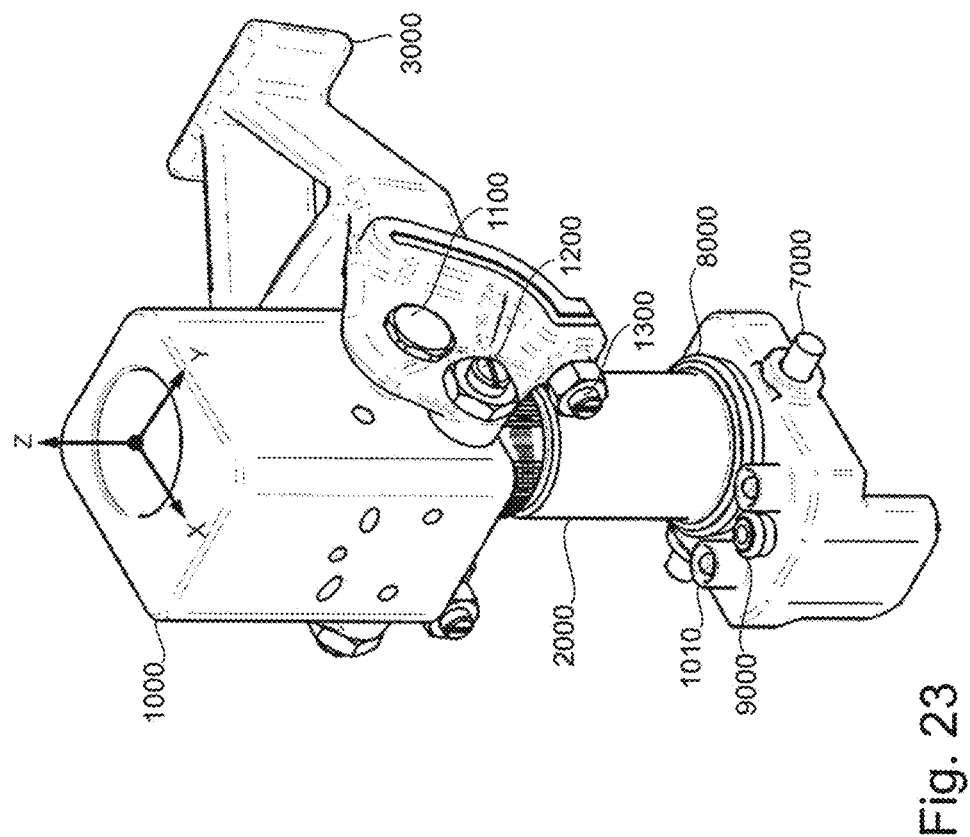
FIG. 23 shows a quick-change and locking mechanism in open position.
Figure 22:
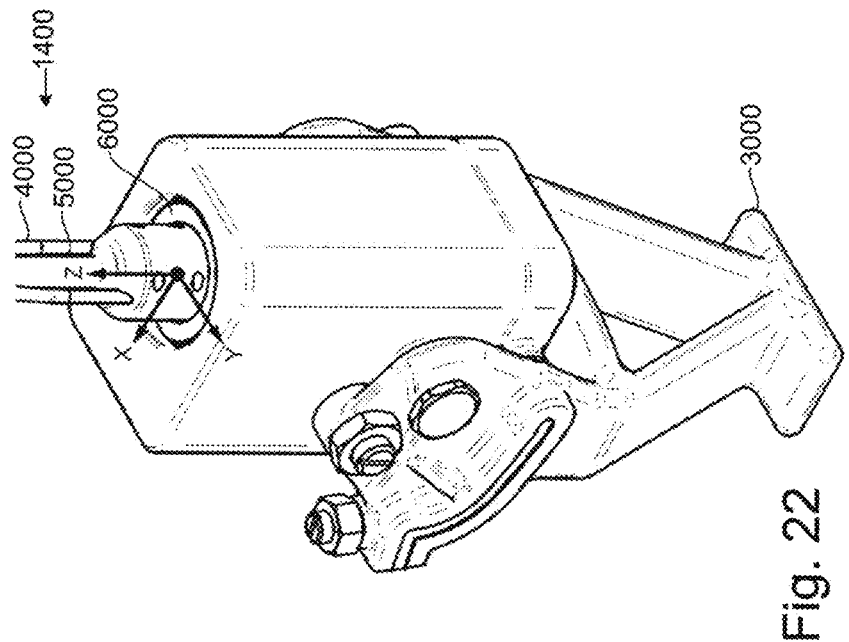
FIG. 22 shows a quick-change and locking mechanism in closed position.

FIG. 22 shows a quick-change and locking mechanism in closed position, while FIG. 23 shows the quick-change and locking mechanism in open position. FIG. 23 is also shown rotated by 90° around the z-axis.

The receiving unit 1000 has an opening on the upper side. A process unit 1400 connected to the adapter 2000 can be passed through this opening from bottom to top. The process unit 1400 includes the gas lance 5000 and the ignition electrodes 4000. The union nut 6000 secures the connection between the process unit 1400 and the adapter 2000 against possible angular errors or an inclined fit.

The seals for a media channel 9000 and the chamber 8000 are integrated on the adapter 2000. Reference sign 1010 identifies the electrical contacts on the adapter 2000.

Two opposite guide bolts 7000 are arranged on the sides of the adapter 2000. These can interact with a guide groove of the locking lever 3000.

The locking lever 3000 is attached to the receiving unit 1000. The locking lever 3000 is rotatably mounted via the mounting 1100. The locking lever engages by means of a spring-loaded element 1200. The latching mechanism 1300 fixes the adapter 2000 in a predetermined area.

The applicant reserves the right to claim all features disclosed in the application documents as being essentially inventive, provided that they are, individually or in combination, new compared to the prior art. It is further pointed out that the individual figures also describe features which may be advantageous in themselves. The skilled person recognises immediately that a certain feature described in a figure can be advantageous even without adopting further features from this figure. Furthermore, the skilled person recognises that advantages may also result from a combination of several features shown in individual or different figures.

LIST OF REFERENCE SIGNS

1 apparatus
2/20 transport device
4(a, b, c, . . . ) handling device
6(a, b, c, . . . ) movable carrier
8(a, b, c, . . . ) treatment stations
10 container
22 (A, B) transport unit
30 infeed starwheel
32 outlet starwheel
34 infeed
36 outlet
40(a, b, c, . . . ) handling unit
60 heating device
62 forming device
64 transfer device
66 transfer device
68 filler
200 second transport device
402 support element
404 locking element
406 gripper
800 treatment device
802 openings
804 base part of the treatment station
806 wall of the treatment station
1000 receiving unit
1010 electrical contacts
1100 mounting
1200 spring-loaded element
1300 latching mechanism
1400 process unit
2000 adapter
3000 locking lever
4000 ignition electrodes
5000 gas lance
6000 union nut
7000 guide pin
8000 seal for chamber
9000 seal for media channel
A outlet
E infeed
P(a, b, c, . . . ) transport path
ÜP transfer point
Ü1, Ü2, Ü3 transfer points
X(a, b, c, . . . ) transfer area
Y(a, b, c, . . . ) discharge area

The invention claimed is:

1. An apparatus for treating containers, having at least one transport device for transporting the containers, having a handling device for transferring a predefined number of containers from the transport device in a transfer area and for discharging these containers to the transport device or a further transport device in a discharge area, having at least one further handling device for transferring a predefined number of containers from the transport device in a further transfer area and for discharging these containers to the transport device or a further transport device in a further discharge area, wherein the handling devices each have a movable carrier with which the removed containers can be moved along a transport path, and wherein at least one treatment station is associated with each of the handling devices, wherein
the transport speed of the handling devices can be controlled in such a way that the transport speed of the handling devices can be synchronised with the transport speed of the transport device and/or the further transport device during transfer and/or discharge of the containers and the transport speed of the handling device can be reduced after the transfer of the containers, and wherein each treatment station is arranged stationary and is located downstream of the transfer area and/or upstream of the discharge area in relation to the transport path of the container, which as a result containers in the transfer area are first transferred to a handling device, fed to a downstream treatment station and, after treatment in the discharge area, discharged from the handling device.

2. The apparatus according to claim 1, wherein the treatment station is arranged downstream of the transfer area and/or upstream of the discharge area relative to the transport path of the containers.

3. The apparatus according to claim 1, wherein the discharge area of a handling device spatially coincides with the transfer area of a handling device.

4. The apparatus according to claim 1, wherein the transport device comprises a plurality of transport units for transporting one container in each case.

5. The apparatus according to claim 1, wherein the transport device and/or a further transport device is a linear transport device.

6. The apparatus according to claim 1, wherein the handling devices are arranged laterally on the transport device.

7. The apparatus according to claim 1, wherein the axes of rotation of the handling devices are arranged in such a way that the axis of rotation of one handling device is arranged in the pivoting circle of the axis of rotation of a further handling device.

8. The apparatus according to claim 1, wherein the apparatus has at least one additional handling device and/or treatment station which would not be necessary to achieve a desired machine output.

9. The apparatus according to claim 1, wherein the apparatus has a second transport device for transporting containers, which is an at least sectionally linear transport device, wherein the first transport device is configured to be switched off at least temporarily so that the supply of containers to the treatment station is interrupted, and the second transport device is configured for transporting the containers from an inlet starwheel to an outlet starwheel even when the first transport device is switched off.

10. The apparatus according to claim 1, wherein the apparatus comprises a second transport device configured for transporting containers, which is at the same time a device for turning the containers and turns the containers by guiding the containers along a curved portion of the transport device.

11. The apparatus according to claim 1, wherein the handling devices and/or the treatment stations is/are configured to be switched off at least temporarily so that the containers can be transported along the transport device without being taken over by the handling devices.

12. The apparatus according to claim 1, wherein the handling devices comprise at least two handling units, each of which is suitable for receiving a container, wherein the handling units being arranged on a common carrier and being interchangeable together with the carrier.

13. The apparatus according to claim 1, wherein the treatment stations have a container-independent receiving unit with a locking lever, configured to be connected to a container-specific process unit via an adapter, wherein the adapter with the process unit arranged thereon is configured to be inserted axially into the receiving unit and a guided feed movement of the adapter is possible by the locking lever and the adapter and the receiving unit are configured to be fixed to one another, wherein seals of media conductors and/or electronic contacts are produced during the guided feed movement.

14. A method for treating containers, in which a transport device transports the containers and in which a handling device takes over a predefined number of containers from the transport device in a transfer area, moves them on a transport path and discharges them to the transport device or a further transport device in a discharge area, wherein at least one further handling device in a further transfer area takes over a predefined number of containers from the transport device, moves them on a transport path and discharges them in a further discharge area to the transport device or to a further transport device, wherein the handling devices transport the containers on the transport path each to at least one treatment station associated with the handling device,
wherein
the transport speed of the handling devices is controlled in such a way that the transport speed of the handling devices during transfer and/or discharge of the containers is synchronised with the transport speed of the transport device and/or the further transport device and the transport speed of the handling device is reduced after the transfer of the containers, and
wherein each treatment station is arranged stationary and is located downstream of the transfer area and/or upstream of the discharge area in relation to the transport path of the container, which as a result containers in the transfer area are first transferred to a handling device, fed to a downstream treatment station and, after treatment in the discharge area, discharged from the handling device.

15. The method according to claim 14, wherein
the containers are moved at a constant speed on the transport device and/or a further transport device.

16. The method according to claim 14, wherein
the speed of the handling devices is reduced to a standstill and the treatment stations treat the containers when they are stopped.

17. The method according to claim 14, wherein
not every transport unit transports a container.

18. The method according to claim 14, wherein
the transport units which transport the containers before the containers are transferred to the handling devices are transport units which are different from the transport units which transport the containers after the containers have been discharged from the handling devices.

19. The method according to claim 14, wherein
the containers are transported to the discharge area immediately after completion of the treatment process by the handling device assigned to this treatment station.

20. The method according to claim 14, wherein
the handling device performs a lifting movement of the containers in addition to the transport movement.

21. The method according to claim 14, wherein
after completion of the treatment process, the handling device is set in motion again and synchronized with the outlet part of the transport device, and further wherein the outlet part is either the outlet part of the original or a further transport device, and further wherein at the discharge point the container or containers are then discharged to the transport device and the treated containers leave the device via the transport device.

* * * * *